(12) United States Patent
Iizuka et al.

(10) Patent No.: US 9,475,535 B2
(45) Date of Patent: Oct. 25, 2016

(54) VEHICLE

(71) Applicant: Yamaha Hatsudoki Kabushiki Kaisha, Iwata-shi, Shizuoka (JP)

(72) Inventors: Toshio Iizuka, Shizuoka (JP); Yosuke Hirayama, Shizuoka (JP); Yutaka Kubo, Shizuoka (JP); Takahiro Watanabe, Shizuoka (JP); Noboru Miyamoto, Shizuoka (JP); Kaoru Sasaki, Shizuoka (JP); Hirokatsu Ogawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/430,371

(22) PCT Filed: Sep. 24, 2013

(86) PCT No.: PCT/JP2013/075715
§ 371 (c)(1),
(2) Date: Mar. 23, 2015

(87) PCT Pub. No.: WO2014/046285
PCT Pub. Date: Mar. 27, 2014

(65) Prior Publication Data
US 2015/0210338 A1    Jul. 30, 2015

(30) Foreign Application Priority Data

Sep. 24, 2012  (JP) .................................. 2012-209873
Jul. 1, 2013   (JP) .................................. 2013-138479

(51) Int. Cl.
*B62K 5/08* (2006.01)
*B62K 5/05* (2013.01)
(Continued)

(52) U.S. Cl.
CPC . *B62K 5/08* (2013.01); *B60G 3/01* (2013.01); *B62K 5/027* (2013.01); *B62K 5/05* (2013.01);
(Continued)

(58) Field of Classification Search
CPC ............. B62K 5/08; B62K 5/05; B62K 5/10
USPC .......................................................... 180/210
See application file for complete search history.

(56) References Cited

U.S. PATENT DOCUMENTS

| 4,020,914 A | * | 5/1977 | Trautwein ............ B60G 21/007 180/15 |
| 4,088,199 A | * | 5/1978 | Trautwein ............ B60G 21/007 180/209 |

(Continued)

FOREIGN PATENT DOCUMENTS

| CN | 1572644 B | 5/2012 |
| EP | 2 404 817 A1 | 1/2012 |

(Continued)

OTHER PUBLICATIONS

Official Communication issued in International Patent Application No. PCT/JP2013/075715, mailed on Dec. 24, 2013.

(Continued)

*Primary Examiner* — Joseph Rocca
*Assistant Examiner* — Michael Stabley
(74) *Attorney, Agent, or Firm* — Keating and Bennett, LLP

(57) ABSTRACT

A vehicle includes a center transmission plate, a first center turnable portion configured to turn about a first center turning axis extending in an up-down direction, a second center turnable portion configured to turn about a second center turning axis extending in a front-rear direction, a left transmission plate, a first left turnable portion configured to turn about a first left turning axis extending in the up-down direction, a second left turnable portion configured to turn about a second left turning axis extending in the front-rear direction, a right transmission plate, a first right turnable portion configured to turn about a first right turning axis extending in the up-down direction, and a second right turnable portion configured to turn about a second right turning axis extending in the front-rear direction. A tie rod is supported on the second center turnable portion, the second left turnable portion, and the second right turnable portion.

5 Claims, 21 Drawing Sheets

(51) Int. Cl.
   *B60G 3/01*    (2006.01)
   *B62K 5/10*    (2013.01)
   *B62K 5/027*   (2013.01)
   *B62K 21/18*   (2006.01)
   *B62K 5/00*    (2013.01)

(52) U.S. Cl.
   CPC .................. *B62K 5/10* (2013.01); *B62K 21/18* (2013.01); *B60G 2200/44* (2013.01); *B60G 2204/422* (2013.01); *B60G 2204/8302* (2013.01); *B60G 2300/122* (2013.01); *B60G 2300/45* (2013.01); *B62K 2005/001* (2013.01)

(56) References Cited

U.S. PATENT DOCUMENTS

| | | | | |
|---|---|---|---|---|
| 4,740,004 | A * | 4/1988 | McMullen | B62K 5/05 280/124.103 |
| 6,505,845 | B1 | 1/2003 | Fong | |
| 6,817,617 | B2 * | 11/2004 | Hayashi | B62K 5/05 280/124.1 |
| 7,073,806 | B2 * | 7/2006 | Bagnoli | B62K 5/05 180/210 |
| 7,487,985 | B1 * | 2/2009 | Mighell | B62K 5/027 180/210 |
| 7,530,419 | B2 * | 5/2009 | Brudeli | B60G 21/007 180/210 |
| 7,708,291 | B1 * | 5/2010 | Henderson | B62D 9/02 280/124.103 |
| 7,909,340 | B2 * | 3/2011 | Henderson | B62D 9/02 280/124.103 |
| 8,070,172 | B1 * | 12/2011 | Smith | B60G 11/08 280/124.103 |
| 8,419,027 | B2 * | 4/2013 | Ting | B62K 5/02 280/124.103 |
| 8,641,064 | B2 * | 2/2014 | Krajekian | B62K 5/027 180/210 |
| 9,227,662 | B2 * | 1/2016 | Bartolozzi | B62D 9/02 |
| 2004/0140645 | A1 | 7/2004 | Hayashi | |
| 2005/0012291 | A1 | 1/2005 | Bagnoli | |
| 2005/0167174 | A1 | 8/2005 | Marcacci | |
| 2008/0115994 | A1 | 5/2008 | Martini et al. | |
| 2012/0161410 | A1 | 6/2012 | Ting et al. | |

FOREIGN PATENT DOCUMENTS

| | | |
|---|---|---|
| GB | 11300 | 0/1911 |
| JP | 2005-313876 A | 11/2005 |
| JP | 2008-168893 A | 7/2008 |
| JP | 2011-195099 A | 10/2011 |
| TW | 201125770 A | 8/2011 |
| TW | 201202081 A | 1/2012 |
| TW | M422524 U1 | 2/2012 |
| WO | 2012/007819 A1 | 1/2012 |

OTHER PUBLICATIONS

Hirayama et al.; "Vehicle"; U.S. Appl. No. 14/430,368, filed Mar. 23, 2015.

Takano et al.; "Vehicle"; U.S. Appl. No. 14/430,376, filed Mar. 23, 2015.

Official Communication issued in corresponding Chinese Patent Application No. 201380038939.0, mailed on Apr. 5, 2016.

* cited by examiner

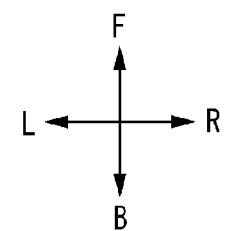
FIG. 19A
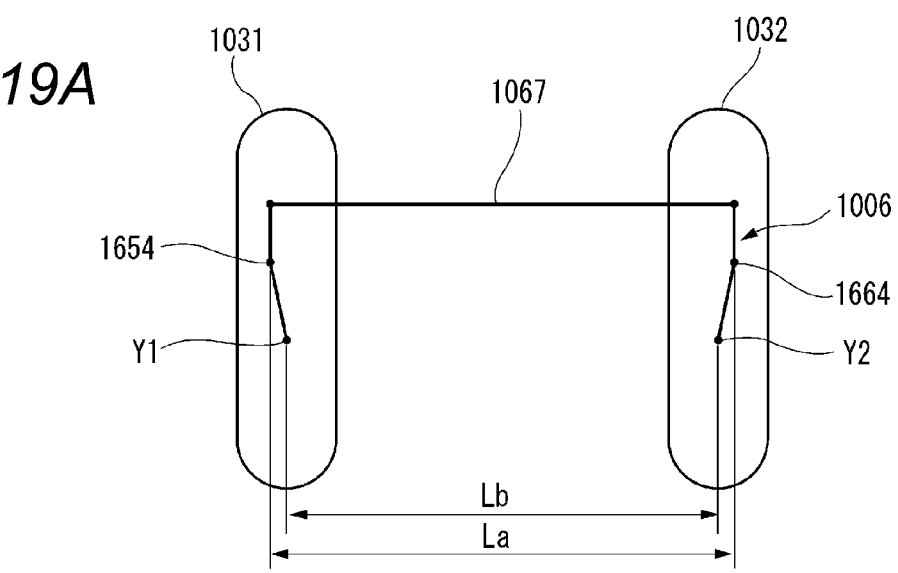
FIG. 19B
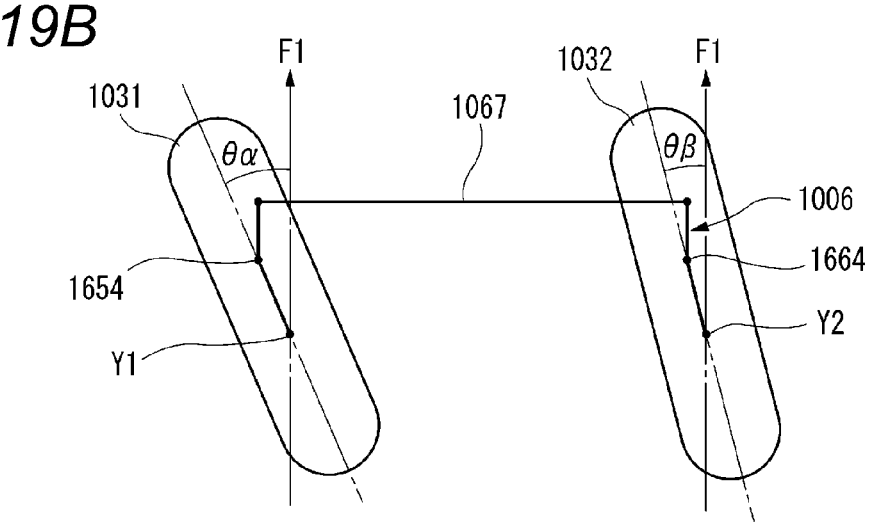

VEHICLE

BACKGROUND OF THE INVENTION

1. Field of the Invention

The present invention relates to a vehicle including a tiltable vehicle body frame and two front wheels.

2. Description of the Related Art

There has been disclosed a vehicle including a tiltable vehicle body frame, two front wheels, and a steering mechanism to transmit a steering force input to turn a steering shaft to a first front wheel and a second front wheel (see International Publication No. WO 2012/007819).

In the vehicle disclosed in International Publication No. WO 2012/007819, joint members are turnable in two axial directions to perform a turning operation to transmit a steering force to the two front wheels and to perform a turning operation to allow the two front wheels to move in the up-down direction. However, with this configuration, it is difficult to increase the steering angle of the vehicle because the turning ranges of the joint members are limited.

Hence, it is conceivable to individually provide a turn shaft member with a turning axis extending in the front-rear direction and a turn shaft member with a turning axis extending in the up-down direction, instead of the joint members. However, in such a configuration in which the turn shaft members are individually provided, the space accommodating the respective turn shaft members and the movable ranges of the components to be connected to the respective turnable members become large.

SUMMARY OF THE INVENTION

Preferred embodiments of the present invention provide a vehicle that reduces or prevents an enlargement of movable ranges of members that transmit a steering force while also providing a large steering angle.

According to a preferred embodiment of the present invention, a vehicle includes a vehicle body frame including a head pipe; a steering member having a turning axis supported by the head pipe such that the steering member is turnable relative to the vehicle body frame; a first front wheel disposed to the left of a center of the vehicle in a vehicle width direction; a second front wheel disposed to the right of the center of the vehicle in the vehicle width direction; a first supporting device disposed to the left of the center of the vehicle in the vehicle width direction, and configured to support the first front wheel so as to be turnable in accordance with a turning motion of the steering member; a second supporting device disposed to the right of the center of the vehicle in the vehicle width direction, and configured to support the second front wheel so as to be turnable in accordance with turning of the steering member; and a steering force transmitting mechanism including a tie rod extending in a left-right direction, and configured to transmit a steering force, which is input to the steering force transmitting mechanism, to the first front wheel and to the second front wheel; wherein the steering force transmitting mechanism includes a center transmission portion configured to not turn relative to the steering member; a first turnable portion supported by the center transmission portion, and configured to turn relative to the center transmission portion about a first up-down turning axis extending in an up-down direction; a first supporting portion connected to the first turnable portion, and configured to support a center portion of the tie rod so as to be turnable relative to the first turnable portion about a first front-rear turning axis extending in a front-rear direction; a second supporting portion supported by a left portion of the tie rod, and configured to turn relative to the left portion of the tie rod about a second front-rear turning axis extending in the front-rear direction; a second turnable portion connected to the second supporting portion; a left transmission portion configured to not turn relative to the first supporting device, being connected to the second turnable portion, and configured to turn relative to the second turnable portion about a second up-down turning axis extending in the up-down direction; a third supporting portion supported by a right portion of the tie rod, and configured to turn relative to the right portion of the tie rod about a third front-rear turning axis extending in the front-rear direction; a third turnable portion connected to the third supporting portion; and a right transmission portion configured to not turn relative to the second supporting device, being connected to the third turnable portion, and configured to turn relative to the third turnable portion about a third up-down turning axis extending in the up-down direction.

In the above-described vehicle, when the steering member is turned, the first supporting section, the second supporting section, and the third supporting section are moved in the left-right direction in a front view of the vehicle while maintaining their postures such that their respective front-rear turning axes are directed in the front-rear direction. Hence, in the steering force transmitting mechanism including the turn shaft members with turning axes extending in the front-rear direction and turn shaft members with turning axes extending in the up-down direction individually, the movable range of the tie rod during the steering as viewed from above of the vehicle is smaller when the supporting sections on which the tie rod is supported are supported so as to be turnable about the turning axes extending in the front-rear direction than when the supporting sections on which the tie rod is supported are supported so as to be turnable about the turning axes extending in the up-down direction. As described above, with the above-described configuration of the vehicle, an enlargement of the movable range of the tie rod during the steering as viewed from above of the vehicle is reduced or prevented while a large steering angle is provided by providing the turn shaft members with turning axes extending in the front-rear direction and the turn shaft members with turning axes extending in the up-down direction individually. Accordingly, it is possible to provide a vehicle that reduces or prevents enlargement of the movable ranges of members that transmit a steering force while also providing a large steering angle.

A vehicle according to a preferred embodiment of the present invention is preferably configured such that the first supporting portion is connected to a front portion of the first turnable portion, the second supporting portion is connected to a front portion of the second turnable portion, and the third supporting portion is connected to a front portion of the third turnable portion.

With this configuration, a distance in the front-rear direction of the vehicle between the tie rod and each of the first up-down turning axis, the second up-down turning axis, and the third up-down turning axis becomes large. However, the moving amounts of the first supporting section, the second supporting section, and the third supporting section in the left-right direction are small. As a result, enlargement of the movable range of the tie rod is reduced or prevented.

A vehicle according to a preferred embodiment of the present invention is preferably configured such that the tie rod is a plate-shaped member extending in the left-right direction; and a length of the tie rod in the up-down direction is longer than a length of the tie rod in the front-rear direction.

With this configuration, the moving amount of the tie rod in the front-rear direction during steering is small and the movable range of the tie rod is small while the rigidity of the tie rod is secured.

A vehicle according to a preferred embodiment of the present invention preferably includes a link mechanism including a turnable member which extends in the left-right direction, which is supported by the vehicle body frame, which is turnable relative to the vehicle body frame about a turning axis disposed above the first front wheel and the second front wheel, and configured to tilt each of the first front wheel and the second front wheel in accordance with a turning motion of the turnable member.

In the above-described vehicle, since the turning axes of the turnable members of the link mechanism are disposed above the first front wheel and the second front wheel, enlargement of the distance (tread) between the first front wheel and the second front wheel due to the disposition of the link mechanism is reduced or prevented. Hence, enlargement of the left-right direction length of the tie rod that transmits the steering force input to the steering member to the first front wheel and the second front wheel is reduced or prevented. As a result, enlargement of the movable ranges of the members that transmit the steering force is further reduced or prevented while a large steering angle is secured.

A vehicle according to a preferred embodiment of the present invention is preferably configured such that a distance in the left-right direction between the second up-down turning axis and the third up-down turning axis is longer than a distance in the left-right direction between a turning axis of the first supporting device extending in the up-down direction and a turning axis of the second supporting device extending in the up-down direction.

In the above-described vehicle, during steering, the first front wheel and the second front wheel are set to postures in which the Ackermann geometry is easily established. Therefore, even if a steering angle is large, the turning radius of the first front wheel is close to that of the second front wheel. For this reason, the first front wheel and the second front wheel are turned smoothly about their respective axles. As a result, the riding comfort level of the vehicle is improved.

Preferred embodiments of the present invention provide a vehicle that reduces or prevents enlargement of the movable ranges of the members that transmit a steering force while also providing a large steering angle.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 19A and 19B are views illustrating the movements of the steering force transmitting mechanism, the first front wheel, and the second front wheel of the vehicle of FIG. 11, wherein FIG. 19A is a schematic view during straight traveling and FIG. 19B is a schematic view during left turning.

DETAILED DESCRIPTION OF THE PREFERRED EMBODIMENTS

Figure 1:
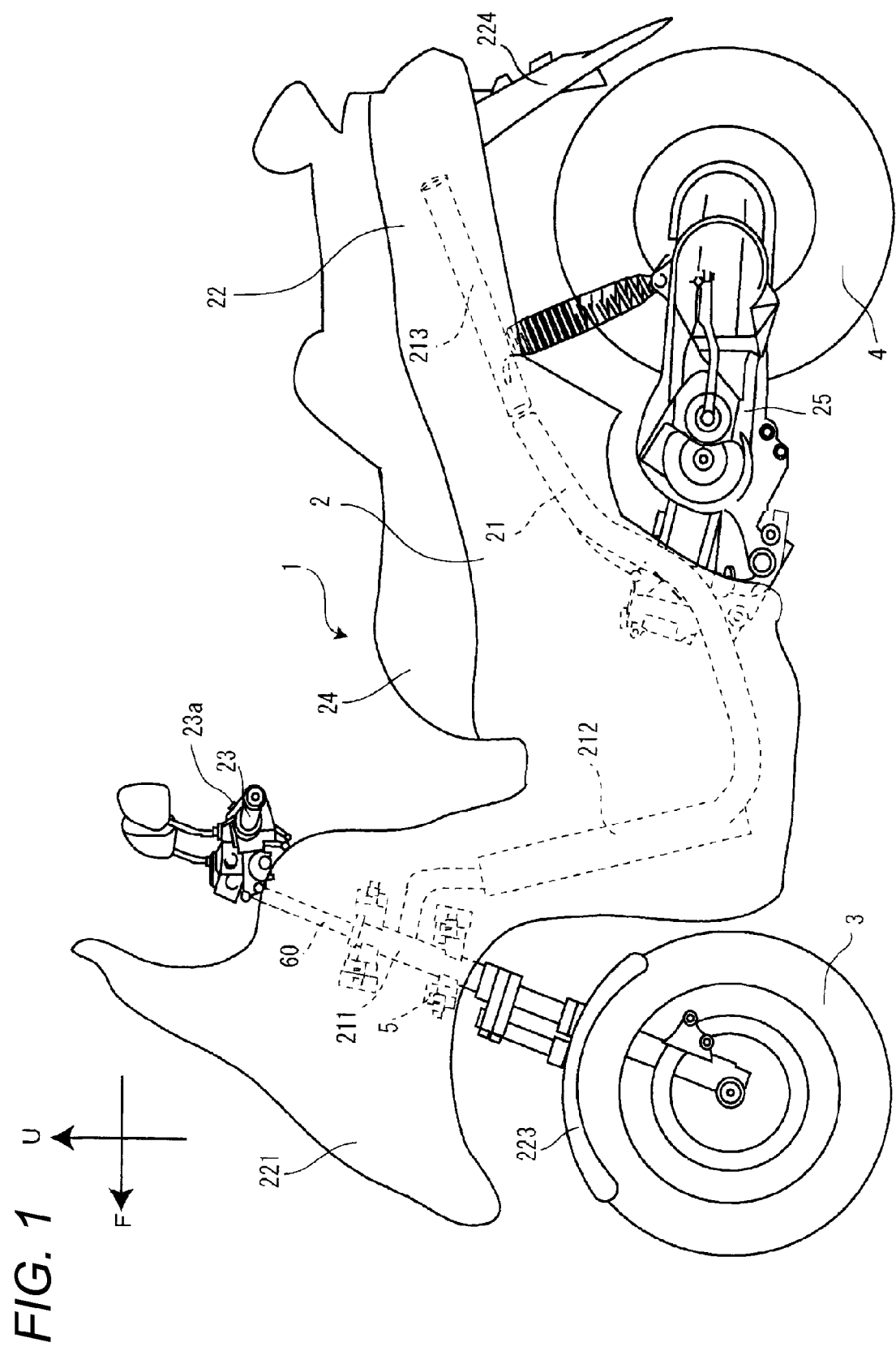
FIG. 1 is an overall side view illustrating a vehicle according to a preferred embodiment of the present invention.

The present invention will be described below referring to the drawings on the basis of preferred embodiments thereof.

First Preferred Embodiment

A three-wheel vehicle 1, which is one example of a vehicle according to a preferred embodiment of the present invention, will be described below referring to FIGS. 1 to 10. In the drawings, the same or corresponding components will be designated by the same numerals and their explanations will not be repeated. In the following descriptions, an arrow F in the drawings indicates the frontward direction of the three-wheel vehicle 1. An arrow R in the drawings indicates the rightward direction of the three-wheel vehicle 1. An arrow L in the drawings indicates the leftward direction of the three-wheel vehicle 1. An arrow U in the drawings indicates the upward direction of the three-wheel vehicle 1. Outward in the vehicle width direction denotes an outward direction from the center in the vehicle width direction. In other words, outward in the vehicle width direction denotes a direction from the center in the vehicle width direction to the leftward or rightward direction. The expression "an axis extending in the front-rear direction" does not necessarily mean only the case in which the axis is parallel or substantially parallel to the front-rear direction. The axis extending in the front-rear direction is an axis inclined in the range of about ±45 degrees, for example, relative to the front-rear direction. Similarly, the axis extending in the up-down direction is an axis inclined in the range of about ±45 degrees, for example, relative to the up-down direction. The axis extending in the left-right direction is an axis inclined in the range of about ±45 degrees, for example, relative to the left-right direction. A component disposed in a right portion of the vehicle and labeled with "first" corresponds to a component disposed in a right portion of a vehicle according to a second preferred embodiment and the claims which is labeled with "second". A component disposed in a left portion of the vehicle and labeled with "second" corresponds to a component disposed in a left portion of the vehicle according to the second preferred embodiment and the claims which is labeled with "first".

FIG. 1 is an overall side view illustrating the three-wheel vehicle 1. In the following descriptions, the front-rear direction and the left-right direction respectively denote the front-rear direction and the left-right direction as viewed from a driver on the three-wheel vehicle 1.

The three-wheel vehicle 1 includes a vehicle body 2, front wheels 3, and a rear wheel 4. The vehicle body 2 includes a vehicle body frame 21, a vehicle body cover 22, a handle bar 23, a seat 24, and a power unit 25.

The vehicle body frame 21 supports the power unit 25, the seat 24 and the like. The power unit 25 includes an engine, a transmission and the like. In FIG. 1, the vehicle body frame 21 is indicated in dashed lines.

The vehicle body frame 21 includes a head pipe 211, a down frame 212, and a rear frame 213. The head pipe 211 is disposed in the front portion of the vehicle. A link mechanism 5 is disposed around the periphery of the head pipe 211. A steering shaft 60 is turnably inserted into the head pipe 211. The steering shaft 60 extends in the up-down direction. The handle bar 23 is attached to an upper end of the steering shaft 60. The down frame 212 is slanted downward and rearward from a front end thereof. The rear frame 213 supports the seat 24, a tail lamp and the like. A switch 23a is attached on the handle bar 23.

The vehicle body frame 21 is covered with the vehicle body cover 22. The vehicle body cover 22 includes a front cover 221, front fenders 223, and a rear fender 224.

The front cover 221 is positioned directly ahead of the seat 24. The front cover 221 covers the head pipe 211 and the link mechanism 5.

The front fenders 223 are respectively disposed directly above the pair of left and right front wheels 3. The front fenders 223 are disposed directly below the front cover 221. The rear fender 224 is disposed directly above the rear wheel 4.

The front wheels 3 are positioned below the head pipe 211 and the link mechanism 5. The front wheels 3 are disposed directly below the front cover 221. The rear wheel 4 is disposed directly below the vehicle body cover 22.

Figure 2:
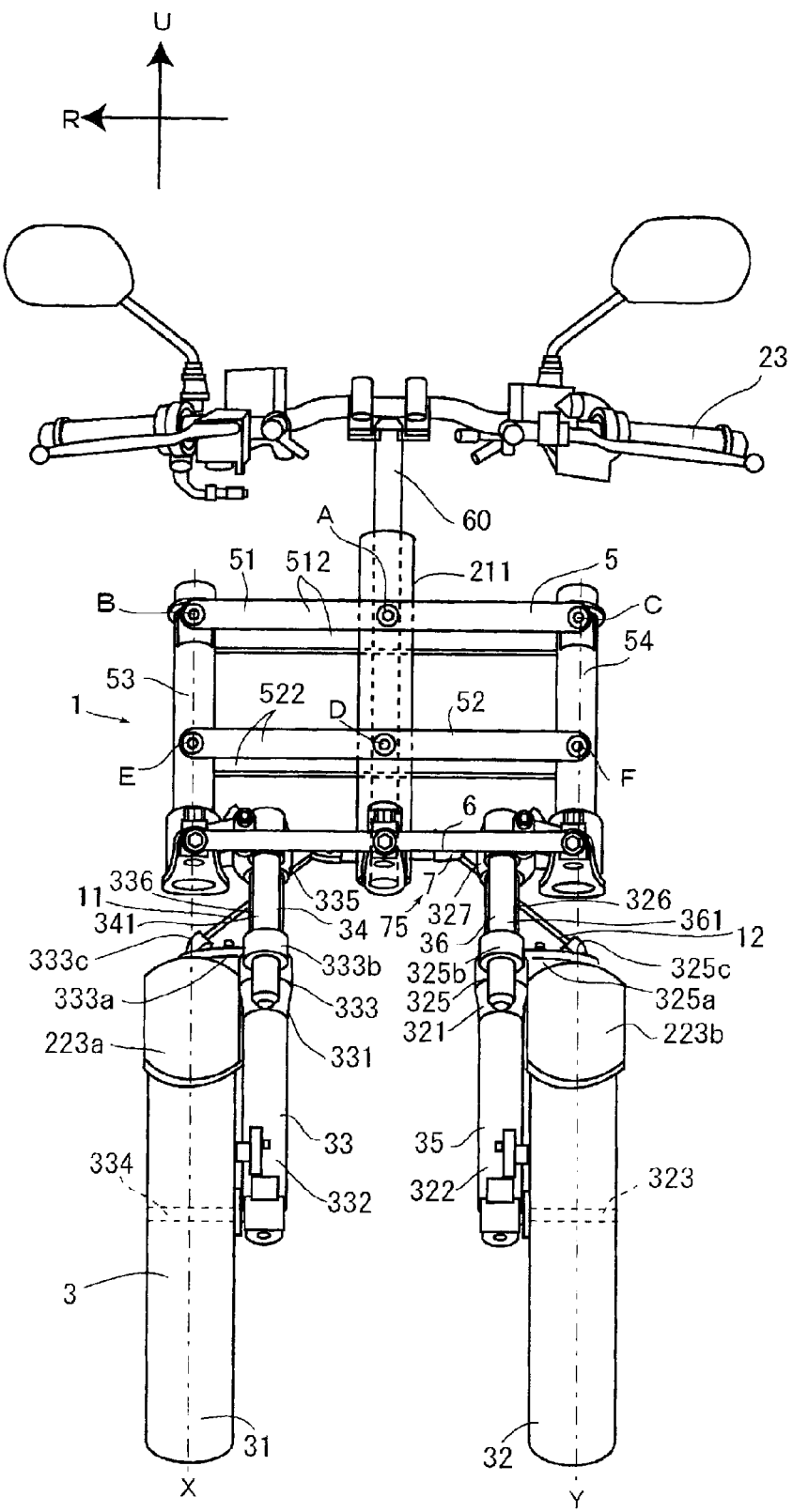
FIG. 2 is an overall front view illustrating the vehicle in a state that a vehicle body cover is removed.

FIG. 2 is an overall front view illustrating the three-wheel vehicle 1 in a state that the vehicle body cover 22 is removed. In FIG. 2, frames, such as the down frame 212, are not illustrated.

The three-wheel vehicle 1 preferably includes the handle bar 23, the steering shaft 60, the head pipe 211, the pair of left and right front wheels 3, a first shock absorber 33, a first turn preventing mechanism 34, a second shock absorber 35, a second turn preventing mechanism 36, the link mechanism 5, an operation force transmitting mechanism 6, and a deformation suppressing mechanism 75.

The front wheels 3 include a first front wheel 31 and a second front wheel 32. The first front wheel 31 is disposed to the right of the center in the vehicle width direction. A first front fender 223a is disposed directly above the first front wheel 31. The second front wheel 32 is disposed to the left of the center in the vehicle width direction. A second front fender 223b is disposed directly above the second front wheel 32. The first front wheel 31 and the second front wheel 32 are disposed symmetrically with the center in the vehicle width direction.

A first support device supports the first front wheel 31. The first support device includes a first bracket 335. The first support device includes the first bracket 335, the first shock absorber 33, and the first turning prevention mechanism 34. The first support device is configured to turn about a first center axis X by the steering force transmitting mechanism.

The first front wheel 31 is supported on a first support member 331. The first front wheel 31 is connected to the lower portion of the first support member 331. The first support member 331 includes a first outer cylinder 332 and a first guide 333. The lower end of the first outer cylinder 332 includes a first support shaft 334. The first support shaft 334 supports the first front wheel 31. The first outer cylinder 332 extends in the up-down direction. The first guide 333 is disposed at the upper end of the first outer cylinder 332. The first guide 333 is fixed to the upper portion of the first outer cylinder 332. The first guide 333 includes a first plate 333a. The first plate 333a extends to a location directly above the first front fender 223a. The first front wheel 31 is steerable about a first center axis X. The first front wheel 31 can change its direction by being steered about the first center axis X. The first center axis X intersects the first plate 333a at a first connection point 333c.

Figure 3:
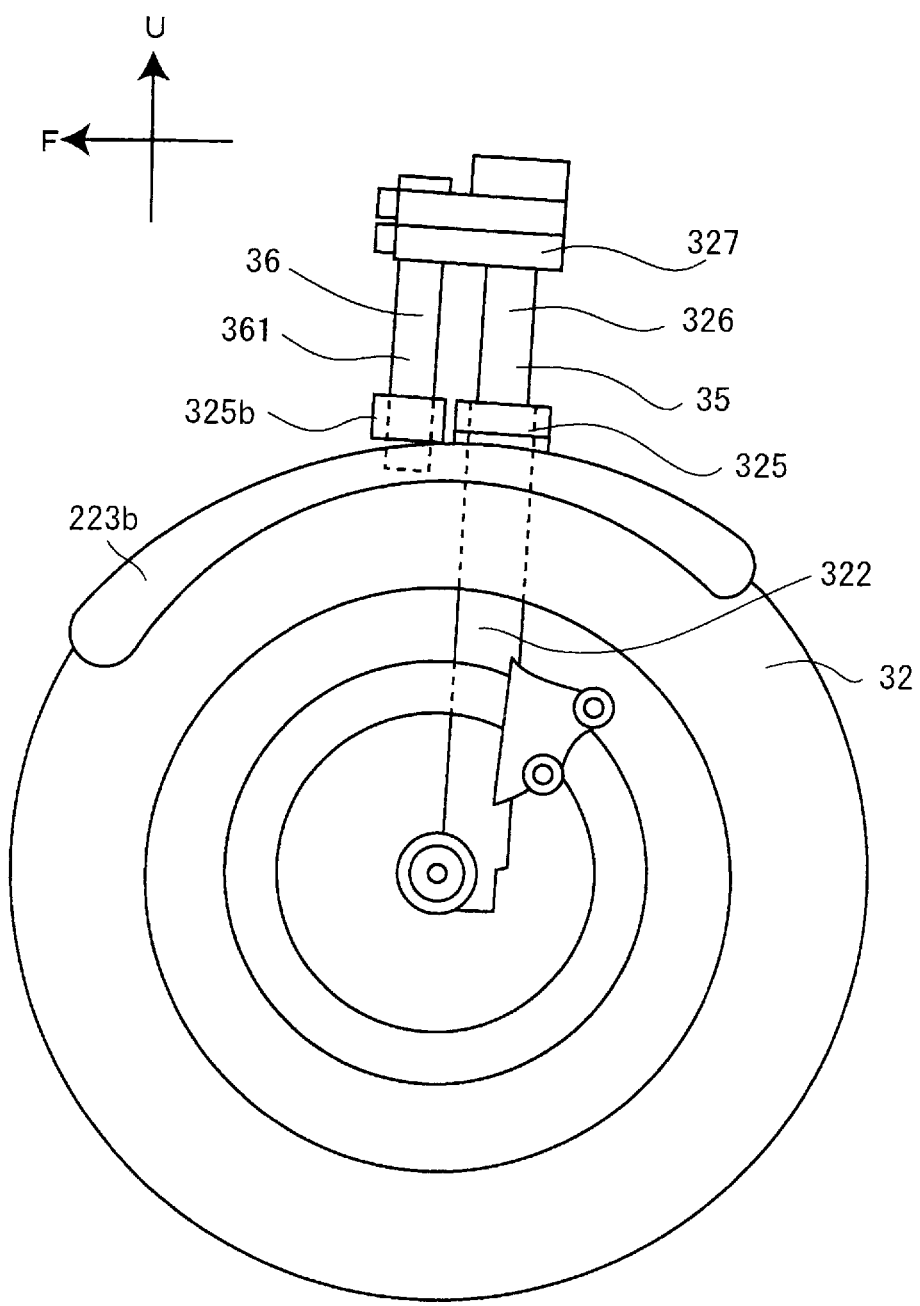
FIG. 3 is a fragmentary schematic side view illustrating a second front wheel and a second turn preventing mechanism.

FIG. 3 is a schematic left side view illustrating the second front wheel 32, the second shock absorber 35, and the second turn preventing mechanism 36.

A second support device supports the second front wheel 32. The second support device includes a second bracket 327. The second support device includes the second bracket 327, the second shock absorber 35, and the second turning prevention mechanism 36. The second support device is configured to turn about a second center axis Y by the steering force transmitting mechanism.

The second shock absorber 35 includes a second outer cylinder 322 and a second inner cylinder 326. The second inner cylinder 326 is partially inserted into the inner periphery of the second outer cylinder 322. The second inner cylinder 326 is disposed directly above the second outer cylinder 322. The second inner cylinder 326 is movable relative to the second outer cylinder 322 in the extending direction of the second outer cylinder 322. A second bracket 327 is disposed at the upper end of the second inner cylinder 326. The upper end of the second inner cylinder 326 is fixed to the second bracket 327. The second shock absorber 35 is preferably a so-called telescopic shock absorber, for example.

The second turn preventing mechanism 36 prevents the turning of the second outer cylinder 322 relative to the second inner cylinder 326. The second turn preventing mechanism 36 includes a second guide 325, a second turn preventing rod 361, and the second bracket 327. The second guide 325 guides the moving direction of the second turn preventing rod 361. The second guide 325 includes a second guide cylinder 325b. The second turn preventing rod 361 is inserted into the inner periphery of the second guide cylinder 325*b*. The second turn preventing rod 361 is movable relative to the second guide cylinder 325*b*. The second turn preventing rod 361 prevents the second front wheel 32 from turning relative to the second inner cylinder 326. The second turn preventing rod 361 is disposed parallel or substantially parallel to the second shock absorber 35. The upper end of the second turn preventing rod 361 is fixed to the second bracket 327. The second turn preventing rod 361 is not movable relative to the second inner cylinder 326. The second bracket 327 secures the second inner cylinder 326 and the second turn preventing rod 361.

The three-wheel vehicle 1 will be described referring again to FIG. 2. The first shock absorber 33 includes the first outer cylinder 332 and a first inner cylinder 336. The first shock absorber 33 and the second shock absorber 35 preferably have similar configurations. The first inner cylinder 336 is partially inserted into the inner periphery of the first outer cylinder 332. The first inner cylinder 336 is disposed directly above the first outer cylinder 332. The first inner cylinder 336 is movable relative to the first outer cylinder 332 in the extending direction of the first outer cylinder 332. A first bracket 335 is disposed at the upper end of the first inner cylinder 336. The upper end of the first inner cylinder 336 is fixed to the first bracket 335. The first shock absorber 33 is preferably a so-called telescopic shock absorber, for example.

The first turn preventing mechanism 34 prevents the turning of the first outer cylinder 332 relative to the first inner cylinder 336. The first turn preventing mechanism 34 and the second turn preventing mechanism 36 preferably have similar configurations. The first turn preventing mechanism 34 includes the first guide 333, a first turn preventing rod 341, and the first bracket 335. The first guide 333 guides the moving direction of the first turn preventing rod 341. The first guide 333 includes a first guide cylinder 333*b*. The first turn preventing rod 341 is inserted into the inner periphery of the first guide cylinder 333*b*. The first turn preventing rod 341 is movable relative to the first guide cylinder 333*b*. The first turn preventing rod 341 prevents the relative turning of the first front wheel 31 relative to the first inner cylinder 336. The first turn preventing rod 341 is disposed parallel or substantially parallel to the first shock absorber 33. The upper end of the first turn preventing rod 341 is fixed to the first bracket 335. The first turn preventing rod 341 is not movable relative to the first inner cylinder 336. The first bracket 335 secures the first inner cylinder 336 and the first turn preventing rod 341.

The second front wheel 32 is supported on a second support member 321. The second front wheel 32 is connected to the lower portion of the second support member 321. The second support member 321 includes the second outer cylinder 322 and the second guide 325. The second outer cylinder 322 includes a second support shaft 323 at its lower end. The second support shaft 323 supports the second front wheel 32. The second outer cylinder 322 extends in the up-down direction. The second guide 325 is disposed at the upper end of the second outer cylinder 322. The second guide 325 is fixed to the upper portion of the second outer cylinder 322. The second guide 325 includes a second plate 325*a*. The second plate 325*a* extends to a location directly above the second front fender 223*b*. The second front wheel 32 is steerable about a second center axis Y. The second front wheel 32 is able to change its direction by being steered about the second center axis Y. The second center axis Y intersects the second plate 325*a* at a second connection point 325*c*.

The link mechanism 5 is disposed directly below the handle bar 23. The link mechanism 5 is disposed directly above the first front wheel 31 and the second front wheel 32. The link mechanism 5 is connected to the head pipe 211. The link mechanism 5 includes a first cross member 51, a second cross member 52, a first side member 53, and a second side member 54.

The first cross member 51 is supported on the vehicle body frame 21 (the head pipe 211) at a supporting section A. The first cross member 51 is supported on the vehicle body frame 21 so as to be turnable about a turning axis (the supporting section A). The first cross member 51 is supported on the head pipe 211 so as to be turnable in a plane including the first cross member 51 and the second cross member 52. The first cross member 51 is turnable relative to the steering shaft 60 in the left-right direction. Even when the steering shaft 60 is turned in accordance with the steering of the handle bar 23, the first cross member 51 will not turn relative to the steering shaft 60. The first cross member 51 includes a pair of plate-shaped members 512. The first cross member 51 extends in the vehicle width direction. The head pipe 211 is located between the pair of plate-shaped members 512 in the front-rear direction. The right end of the first cross member 51 is connected to the first side member 53 via a connecting section B. The first cross member 51 is connected to the first side member 53 so as to be turnable about a turning axis B. The left end of the first cross member 51 is connected to the second side member 54 via a connecting section C. The first cross member 51 is disposed so as to be turnable relative to the second side member 52 about a turning axis C. The first cross member 51 is turnable relative to the first side member 53 and the second side member 54 in the plane including the first cross member 51 and the second cross member 52.

The second cross member 52 is supported on the vehicle body frame 21 (the head pipe 211) at a supporting section D. The second cross member 52 is supported on the vehicle body frame 21 so as to be turnable about a turning axis (the supporting section D). The second cross member 52 is supported on the head pipe 211 so as to be turnable in the plane including the first cross member 51 and the second cross member 52. The second cross member 52 is disposed directly below the first cross member 51. The second cross member 52 extends parallel or substantially parallel to the first cross member 51. The first cross member 51 and the second cross member 52 preferably have the same length. The second cross member 52 is turnable relative to the steering shaft 60 in the left-right direction. Even when the steering shaft 60 is turned in accordance with the steering of the handle bar 23, the second cross member 52 will not turn relative to the steering shaft 60. The second cross member 52 includes a pair of plate-shaped members 522. The second cross member 52 extends in the vehicle width direction. The head pipe 211 is located between the pair of plate-shaped members 522 in the front-rear direction. The right end of the second cross member 52 is connected to the first side member 53 via a connecting section E. The second cross member 52 is connected to the first side member 53 so as to be turnable about a turning axis (the connecting section E). The left end of the second cross member 52 is connected to the second side member 54 via a connecting section F. The second cross member 52 is disposed so as to be turnable relative to the second side member 54 about a turning axis (the connecting section F). The second cross member 52 is turnable relative to the first side member 53 and the second side member 54 in the plane including the first cross member 51 and the second cross member 52. In the present preferred embodiment, the first cross member 51 and the second cross member 52 are preferably provided as a pair of plate-shaped members extending in the left-right direction and arranged in the front-rear direction. However, each of the first cross member 51 and the second cross member 52 preferably includes a member extending from the head pipe 211 in the right direction and a member extending from the head pipe 211 in the left direction.

The first side member 53 is disposed directly to the right of the head pipe 211. The first side member 53 extends in the extending direction of the head pipe 211. The first side member 53 extends in the extending direction of the steering shaft 60. The first side member 53 is disposed directly above the first front wheel 31. The first side member 53 is connected to the first bracket 335 at the lower end thereof. The first side member 53 is disposed so as to be turnable relative to the first bracket 335 about the first center axis X. The first bracket 335 is turned about the portion connected to the first side member 53 in accordance with the steering of the handle bar 23. Even when the first bracket 335 is turned, the first side member 53 will not turn relative to the vehicle body frame 21. The first side member 53 is disposed to the right of the first shock absorber 33. The first side member 53 is disposed above the first shock absorber 33.

The second side member 54 is disposed directly to the left of the head pipe 211. The second side member 54 extends in the extending direction of the head pipe 211. The second side member 54 extends in the extending direction of the steering shaft 60. The second side member 54 is disposed directly above the second front wheel 32. The second side member 54 is connected to the second bracket 327 at the lower end thereof. The second side member 54 is disposed so as to be turnable relative to the second bracket 327 about the second center axis Y. The second bracket 327 is turned about the portion connected to the second side member 54 in accordance with the steering of the handle bar 23. Even when the second bracket 327 is turned, the second side member 54 will not turn relative to the vehicle body frame 21. The second side member 54 is disposed to the left of the second shock absorber 35. The second side member 54 is disposed above the second shock absorber 35.

The operation force transmitting mechanism 6 transmits the operation force of the handle bar 23 to the first front wheel 31 and the second front wheel 32 in accordance with the handle bar operation by the driver. A portion of the operation force transmitting mechanism 6 is disposed directly below the second cross member 52. The operation force transmitting mechanism 6 is disposed above the first front wheel 31 and the second front wheel 32.

The deformation suppressing mechanism 75 reduces or prevents the deformation of the link mechanism 5. The deformation suppressing mechanism 75 includes a first connection member 11, a second connection member 12, and a suppressing mechanism 7.

The first connection member 11 is disposed on the first plate 333a. The first connection member 11 is disposed at the first connection point 333c where the first plate 333a intersects the first center axis X. Here, the first connection member 11 may not be disposed at the position strictly aligned with the first connection point 333c. In other words, the first connection member 11 may be disposed at a position slightly deviated from the first connection point 333c. The first connection member 11 is disposed on the upper surface of the first plate 333a. The first connection member 11 extends from the first plate 333a toward the head pipe 211.

The first connection member 11 includes a bar-shaped portion. The first connection member 11 is disposed directly below the link mechanism 5.

The second connection member 12 is disposed on the second plate 325a. The second connection member 12 is disposed at the second connection point 325c where the second plate 325a intersects the second center axis Y. Here, the second connection member 12 may not be disposed at the position strictly aligned with the second connection point 325c. In other words, the second connection member 12 may be disposed at a position slightly deviated from the second connection point 325c. The second connection member 12 is disposed on the upper surface of the second plate 325a. The second connection member 12 extends from the second plate 325a toward the head pipe 211. The second connection member 12 includes a bar-shaped portion. The second connection member 12 is disposed directly below the link mechanism 5.

The suppressing mechanism 7 reduces or prevents the movement of the first connection member 11 relative to the head pipe 211. The suppressing mechanism 7 reduces or prevents the movement of the second connection member 12 relative to the head pipe 211. The suppressing mechanism 7 is disposed directly below the link mechanism 5.

Figure 4:
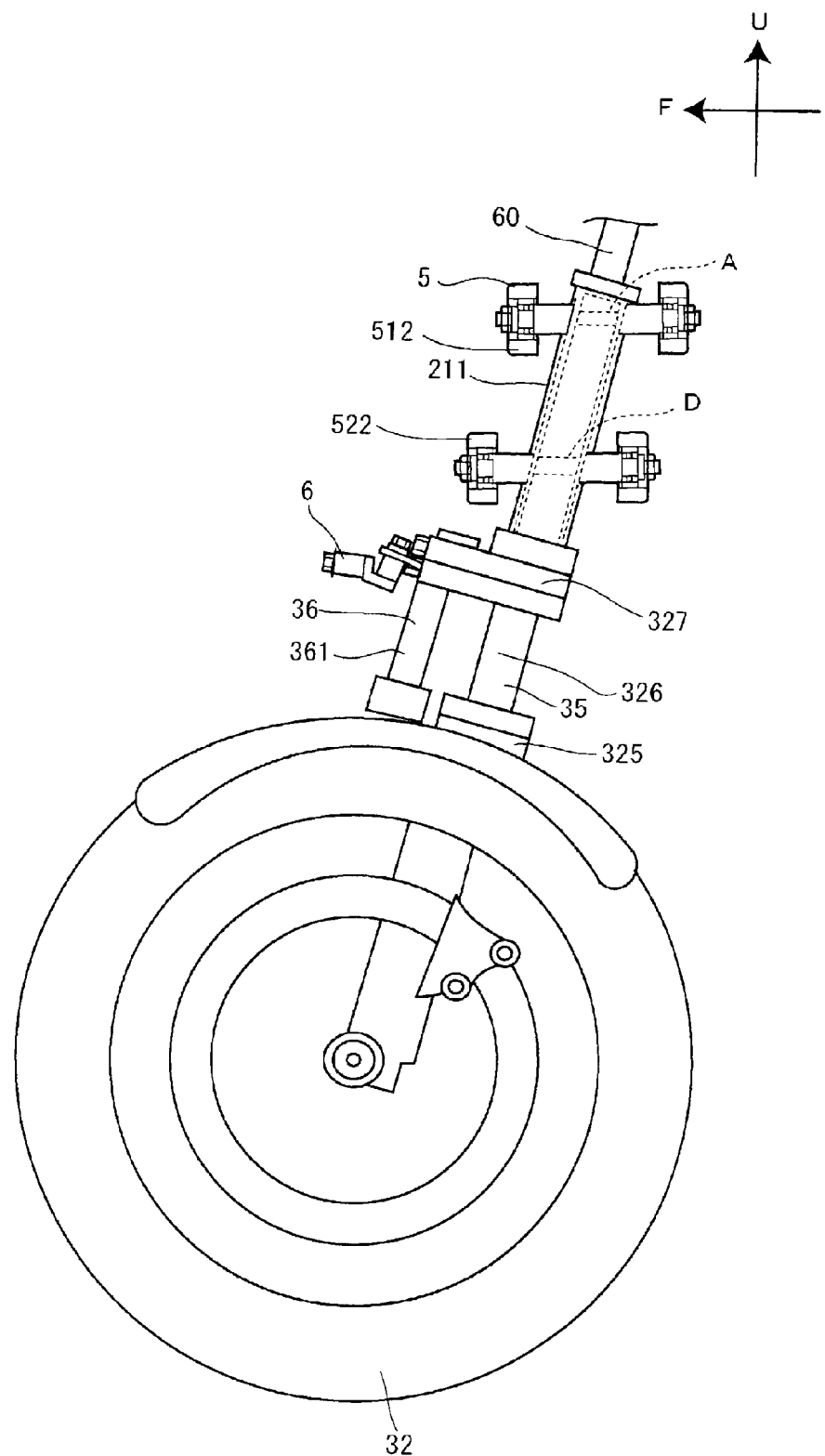
FIG. 4 is a fragmentary side view illustrating the vehicle.

FIG. 4 is a left side view illustrating an area around the periphery of the link mechanism 5 and the second front wheel 32. In FIG. 4, the down frame 212, the handle bar 23 and the like which are located behind the link mechanism 5 are not illustrated. The upper portion of the head pipe 211 is located between the pair of plate-shaped members 512 in the front-rear direction. The lower portion of the head pipe 211 is located between the pair of plate-shaped members 522 in the front-rear direction. In the side view, the turning axis (the supporting section A) extends so as to intersect the steering shaft 60. In the side view, the turning axis (the supporting section D) extends so as to intersect the steering shaft 60. In the side view, the upper end of the second shock absorber 35 is disposed below the lower end of the link mechanism 5. Although not illustrated in FIG. 4, in the side view, the upper end of the first shock absorber 33 is disposed below the lower end of the link mechanism 5.

Figure 5:
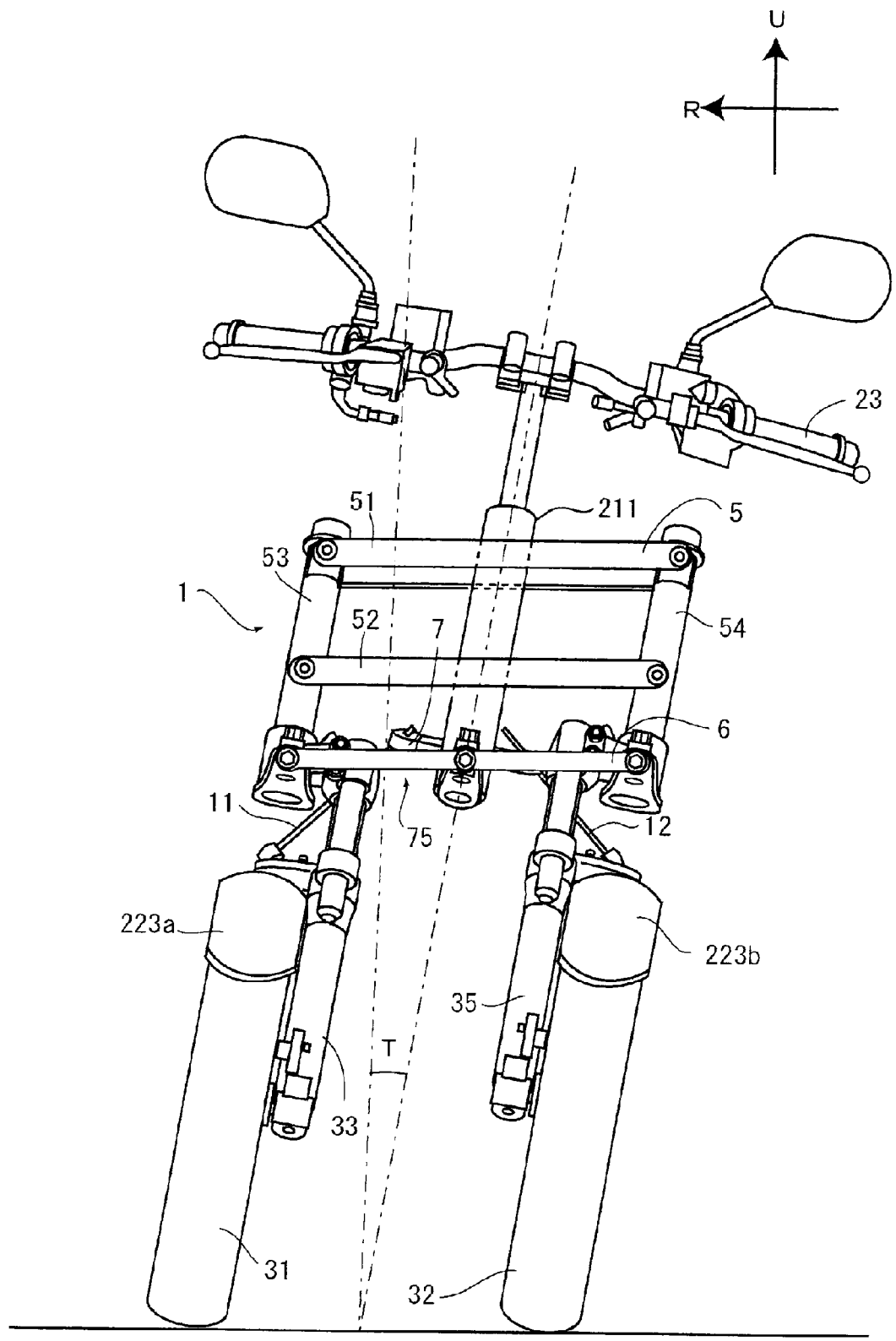
FIG. 5 is an overall front view illustrating a state that the vehicle is tilted.

FIG. 5 is an overall front view showing a state that the three-wheel vehicle 1 is tilted leftward by an angle T. When vehicle body of the three-wheel vehicle 1 is tilted in the left-right direction, the link mechanism 5 is deformed. When the driver tilts the vehicle body of the three-wheel vehicle 1 leftward by the angle T, the head pipe 211 is tilted leftward relative to the vertical direction. When the head pipe 211 is tilted, the first cross member 51 and the second cross member 52 are turned relative to the head pipe 211. In accordance with the leftward tilting of the head pipe 211, the left end of the first cross member 51 is moved to the left of the left end of the second cross member 52. Since the first cross member 51 is moved to the left of the second cross member 52, the second side member 54 is tilted. Incidentally, the second side member 54 extends parallel or substantially parallel to the head pipe 211. Like the second side member 54, the first side member 53 is tilted relative to the vertical direction. The first side member 53 extends parallel or substantially parallel to the head pipe 211. When the first side member 53 and the second side member 54 are tilted, the first side member 53 is turned relative to the first cross member 51 and the second cross member 52. When the first side member 53 and the second side member 54 are tilted, the second side member 54 is turned relative to the first cross member 51 and the second cross member 52.

When the three-wheel vehicle 1 is tilted in this manner, the first front wheel 31 and the second front wheel 32 are respectively tilted relative to the vertical direction as viewed from the front of the vehicle. When the vehicle is tilted, each of the first front wheel 31 and the second front wheel 32 maintains a posture that extends parallel or substantially parallel to the head pipe 211.

Figure 6:
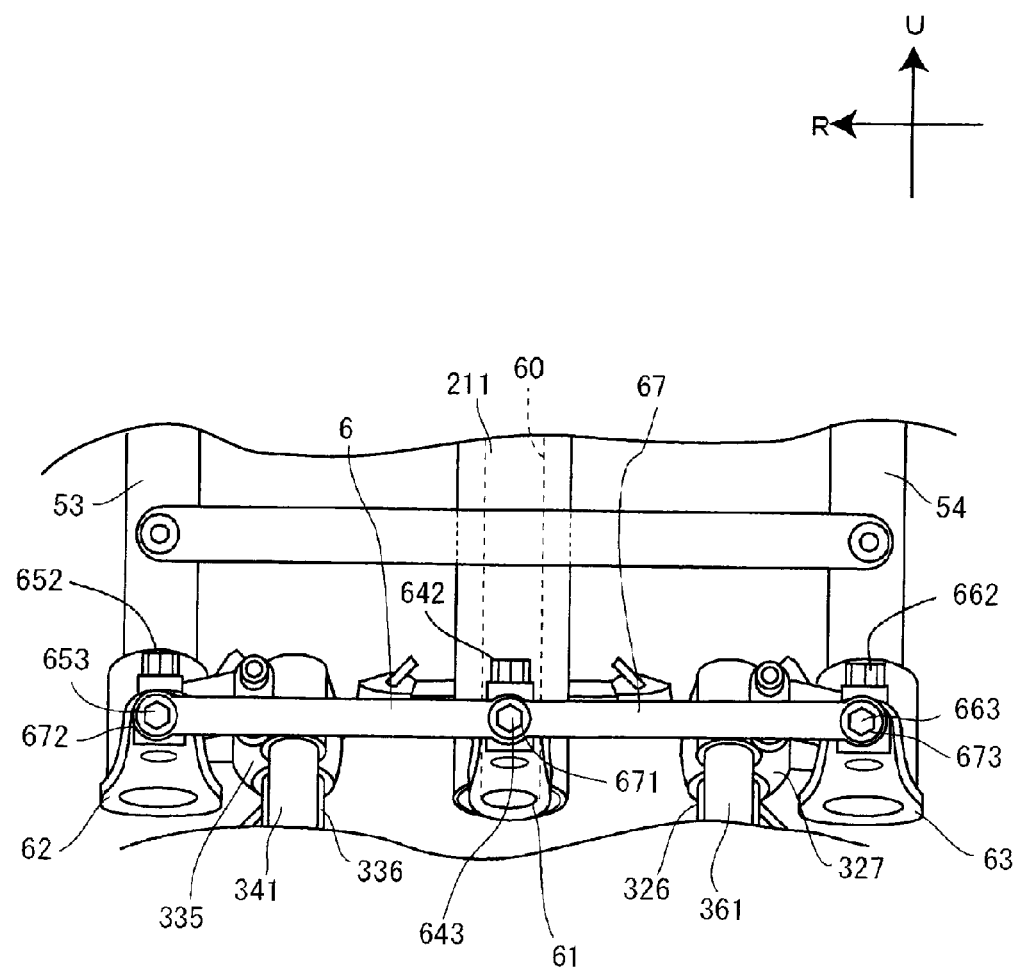
FIG. 6 is an enlarged fragmentary front view illustrating an operation force transmitting mechanism.

FIG. 6 is an enlarged fragmentary front view showing the operation force transmitting mechanism 6. The operation force transmitting mechanism 6 includes the steering shaft 60, a first transmission plate 61 (one example of a center transmitting section), a second transmission plate 62 (one example of a right transmitting section), a third transmission plate 63 (one example of a left transmitting section), a first transmission member 67 (one example of a tie rod), the first bracket 335, and the second bracket 327.

The first transmission plate 61 is connected to the steering shaft 60. The first transmission plate 61 is not turnable relative to the steering shaft 60. When the handle bar 23 is steered relative to the head pipe 211, the steering shaft 60 is turned relative to the head pipe 211. In accordance with the turning motion of the steering shaft 60, the first transmission plate 61 is turned.

The second transmission plate 62 is connected to the first side member 53. The second transmission plate 62 is connected to the first side member 53 and turnable relative to the first side member 53. The second transmission plate 62 is fixed to the first bracket 335. The second transmission plate 62 is located directly below the first bracket 335.

The third transmission plate 63 is connected to the second side member 54. The third transmission plate 63 is connected to the second side member 54 and turnable relative to the second side member 54. In the front view, the third transmission plate 63 is disposed symmetrically with the second transmission plate 62 relative to the first transmission plate 61. The third transmission plate 63 is fixed to the second bracket 327. The third transmission plate 63 is located directly below the second bracket 327.

The first transmission member 67 transmits the operation force transmitted from the steering shaft 60 to the first bracket 335 and the second bracket 327. The first transmission member 67 extends in the vehicle width direction. A detailed configuration that transmits the operation force from the steering shaft 60 to the first bracket 335 and the second bracket 327 will be described below.

Figure 7:
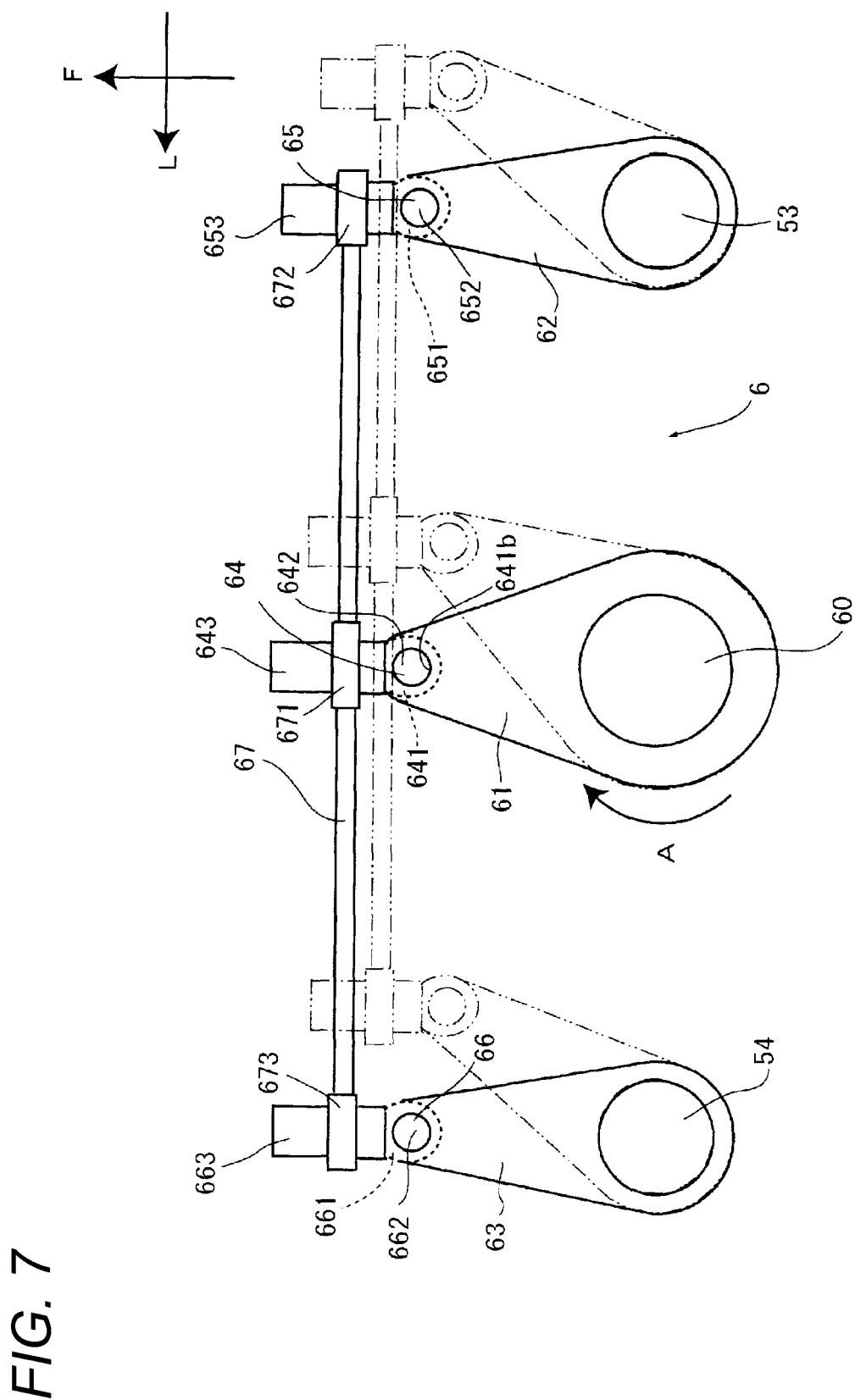
FIG. 7 is a schematic configuration view illustrating a portion of the operation force transmitting mechanism.

FIG. 7 is a schematic plan view showing the configuration of the operation force transmitting mechanism 6. In FIG. 7, the operation force transmitting mechanism 6 is viewed from above. Here, the configurations of the link mechanism 5, the brackets and the like are not illustrated. The dashed chain lines in FIG. 7 indicate a state that the steering shaft 60 is turned in the direction of an arrow A.

The operation force transmitting mechanism 6 includes the first transmission plate 61, the second transmission plate 62, the third transmission plate 63, a first joint 64, a second joint 65, a third joint 66, and the first transmission member 67.

The front portion of the first transmission plate 61 is narrower than the rear portion of the first transmission plate 61. The first joint 64 is disposed at the front portion of the first transmission plate 61.

The width of the front portion of the second transmission plate 62 is narrower than the width of the rear portion of the second transmission plate 62. The second joint 65 is disposed at the front portion of the second transmission plate 62. The second transmission plate 62 is disposed directly to the right of the first transmission plate 61.

The width of the front portion of the third transmission plate 63 is narrower than the width of the rear portion of the third transmission plate 63. The third joint 66 is disposed at the front portion of the third transmission plate 63. The third transmission plate 63 is disposed to the left of the first transmission plate 61.

The first joint 64 includes a first bearing 641 (one example of a first turnable portion), a first shaft 642 (one example of a first up-down turning axis), and a first front rod 643 (one example of a first supporting section). The first shaft 642 is turnable relative to the first bearing 641. The first bearing 641 supports the first shaft 642. The first bearing 641 is supported on the first transmission plate 61. The first transmission plate 61 includes a first support hole 641b that supports the first shaft 641. The first shaft 642 is inserted into the first support hole 641b. The first bearing 641 is fixed to the first shaft 642. The first shaft 642 is disposed at the front end of the first transmission plate 61.

The first front rod 643 extends forward from the first bearing 641. The first front rod 643 is turnable in the left-right direction about the center of the first shaft 642 when the first bearing 641 turns relative to the first transmission plate 61. The first front rod 643 is fixed to the first bearing 641.

The second joint 65 includes a second bearing 651 (one example of a third turnable portion), a second shaft 652 (one example of a third up-down turning axis), and a second front rod 653 (one example of a third supporting section). The second bearing 651 preferably has a configuration similar to that of the first bearing 641. The second shaft 652 preferably has a configuration similar to that of the first shaft 642. The second front rod 653 preferably has a configuration similar to that of the first front rod 643.

The third joint 66 includes a third bearing 661 (one example of a second turnable portion), a third shaft 662 (one example of a second up-down turning axis), and a third front rod 663 (one example of a second supporting section). The third bearing 661 preferably has a configuration similar to that of the first bearing 641. The third shaft 662 preferably has a configuration similar to that of the first shaft 642. The third front rod 663 preferably has a configuration similar to that of the first front rod 643.

The first transmission member 67 includes a first ring 671, a second ring 672, and a third ring 673. The first front rod 643 is inserted into the first ring 671. The first ring 671 is provided at the center in the left-right direction of the first transmission member 67. The second ring 672 is disposed directly to the right of the first ring 671. The second front rod 653 is inserted into the second ring 672. The third ring 673 is disposed directly to the left of the first ring 671. The third front rod 663 is inserted into the third ring 673.

Figure 8:
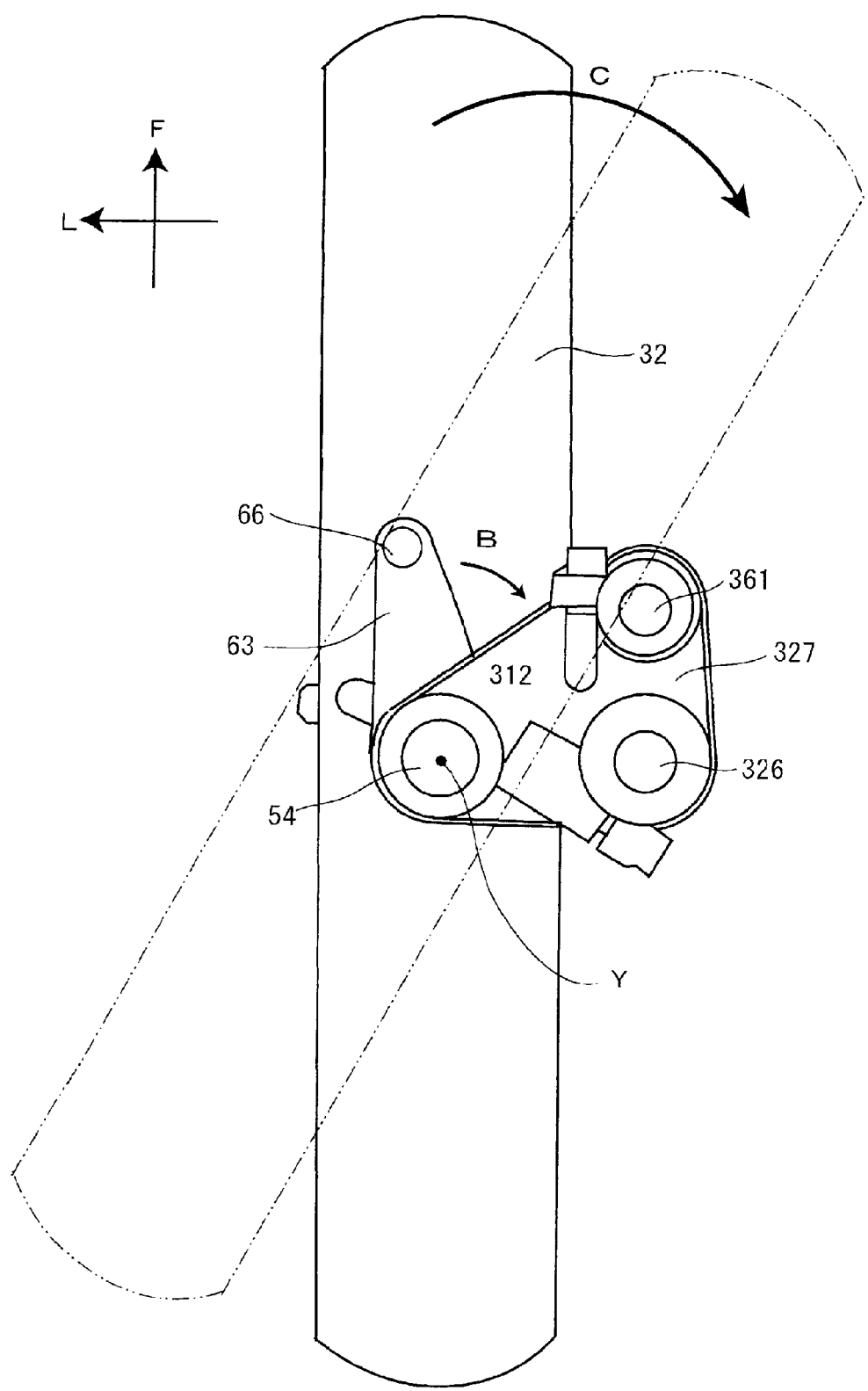
FIG. 8 is an enlarged fragmentary plan view illustrating a second bracket and a front wheel.

FIG. 8 is a plan view showing the second front wheel 32 and the second bracket 327. The dashed chain lines in FIG. 8 indicate a state that the second front wheel 32 is steered. The second front fender 223b is not illustrated.

The second bracket 327 supports the second side member 54 as described above. The third transmission plate 63 is disposed on the second bracket 327.

When the steering shaft 60 is turned, the first transmission plate 61 is turned in accordance with the turning motion of the steering shaft 60. For example, when the steering shaft 60 is turned in the direction of the arrow A in FIG. 7, the first ball joint 64 is moved right-rearward in accordance with the turning of the first transmission plate 61. Incidentally, the first ball 642 is turned relative to the first bearing 641, such that the first transmission member 67 is moved right-rearward while the posture of the first transmission member 67 is maintained. In accordance with the rightward movement of the first transmission member 67, the second front rod 653 and the third front rod 663 are moved right-rearward. When the second front rod 653 and the third front rod 663 are moved right-rearward, the second bearing 651 and the third bearing 661 are moved right-rearward. In accordance with the right-rearward movement of the second bearing 651 and the third bearing 661, the second transmission plate 62 and the third transmission plate 63 are turned in the direction of the arrow A about the centers of the first side member 53 and the second side member 54, respectively. Accordingly, the state indicated in the dashed chain lines in FIG. 7 is obtained.

When the third transmission plate 63 is turned about the center of the third side member 54, the second bracket 327 is turned in the direction of the arrow B in FIG. 8 via a third transmission member 69. When the second bracket 327 is turned in the direction of the arrow B, the second front wheel 32 is steered in the direction of the arrow C in FIG. 8 via the second shock absorber 35. The front wheel 32 is steered about the second center axis Y. Accordingly, the front wheel 32 is set to the state indicated in the dashed chain lines in FIG. 8. Like the second front wheel 32, the first front wheel 31 is steered about the first center axis X. The first front wheel 31 and the second front wheel 32 are steered as described above by operating the handle bar 23.

Figure 9:
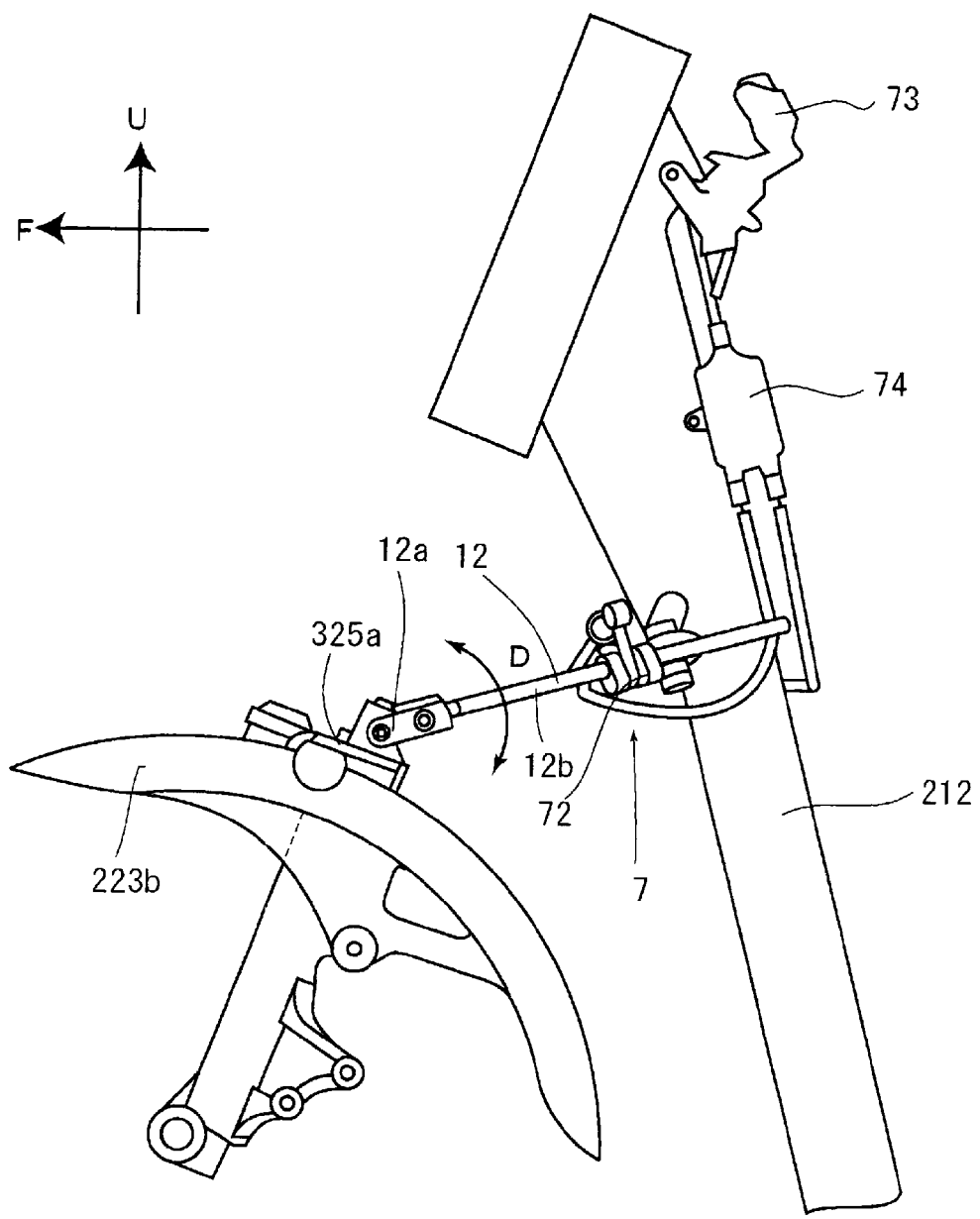
FIG. 9 is a fragmentary side view illustrating an area around the periphery of a suppressing mechanism.

FIG. 9 is a left side view showing a portion of the suppressing mechanism 7 as viewed from the outward in the vehicle width direction. The suppressing mechanism 7 includes the first connection member 11, the second connection member 12, a lever 73, a connection mechanism 74, and calipers 72. The calipers 72 are respectively disposed to the left and right of the head pipe 211. Here, FIG. 9 illustrates only the left caliper 72. Since the first connection member 11 preferably has the same configuration as that of the second connection member 12, the description for the same will be omitted. FIG. 9 illustrates only the left second connection member 12.

The second connection member 12 includes a turn supporting section 12a and a pole 12b. The turn supporting section 12a supports one end of the pole 12b. The turn supporting section 12a supports the pole 12b so that the pole 12b is turnable about a turning axis extending in the vehicle width direction. The turn supporting section 12a supports the pole 12b so that the pole 12b is turnable in the direction of an arrow D. The pole 12b extends upward and rearward from the second plate 325a. The rear end of the pole 12b is a free end.

The lever 73 is used to operate the caliper 72. The lever 73 is connected to the connection mechanism 74. The lever 73 is disposed on the vehicle body cover 22.

The connection mechanism 74 connects the lever 73 to the caliper 72. When the lever 73 is operated, the connection mechanism 74 transmits the operation force of the lever 73 to the caliper 72.

The caliper 72 reduces or prevents the movement of the second connection member 12. When the lever 73 is operated, the operation force is transmitted via the connection mechanism 74, and the caliper 72 reduces or prevents the movement of the second connection member 12 relative to the head pipe 211.

Figure 10:
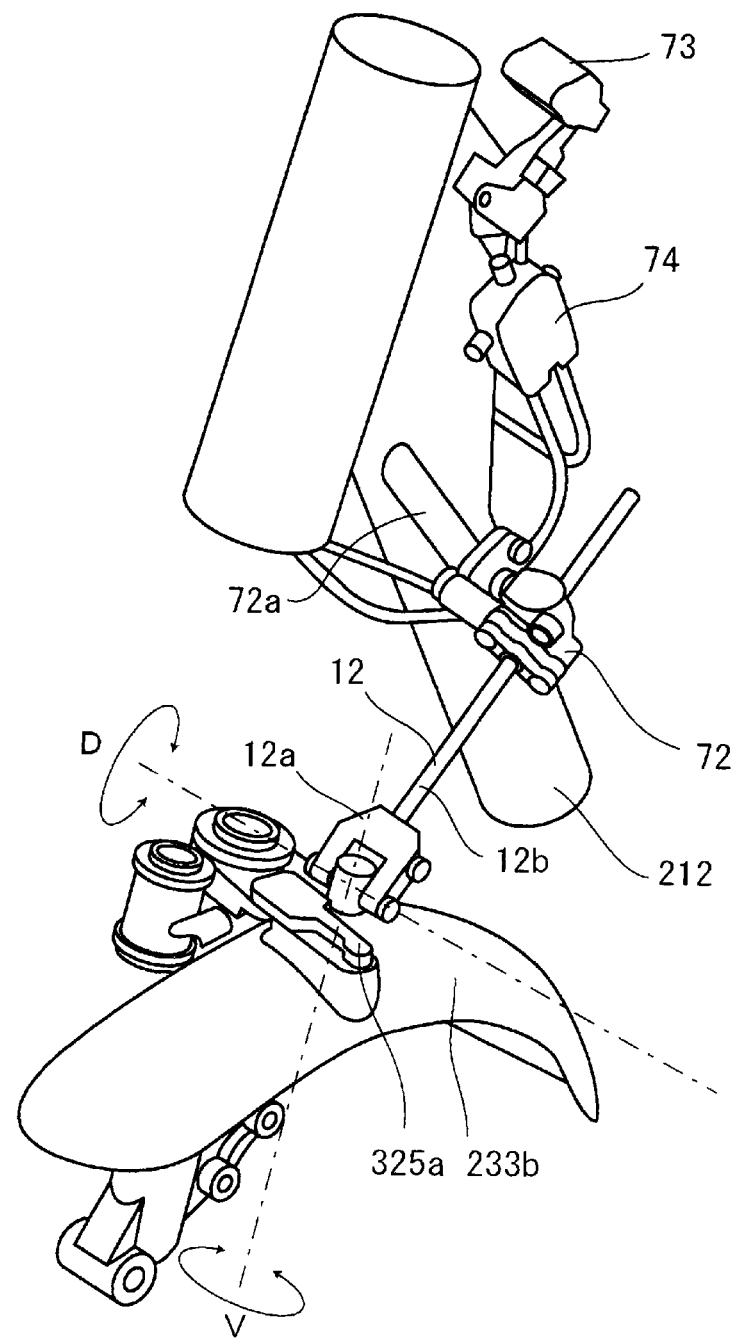
FIG. 10 is a fragmentary perspective view illustrating a portion of the suppressing mechanism.

FIG. 10 is a fragmentary perspective view showing a portion of the suppressing mechanism 7. The turn supporting section 12a supports the pole 12b so that the pole 12b is turnable not only in the direction of the arrow D but also in the direction of an arrow V. The arrow V indicates the direction of the turning about the turning axis extending in the vertical direction. The caliper 72 is disposed outward of the down frame 212 in the vehicle width direction. The caliper 72 is connected to a support member 72a that is connected to the vehicle body frame 21. The support member 72a extends outward in the vehicle width direction from the vehicle body frame 21. The lever 73 is disposed directly behind the down frame 212.

In a state that the lever 73 is not operated, the calipers 72 do not reduce or prevent the movement of the first connection member 11 and the second connection member 12 relative to the head pipe 211. When traveling straight, the driver drives the three-wheel vehicle 1 in the state illustrated in FIG. 2. When turning, the driver steers the handle bar 23 of the three-wheel vehicle 1 in the traveling direction and tilts the three-wheel vehicle 1 as illustrated in FIG. 5. In the three-wheel vehicle 1, the steering of the handle bar 23 is transmitted to the first front wheel 31 and the second front wheel 32 via the steering shaft 60, the first transmission plate 61, the second transmission plate 62, and the third transmission plate 63. Accordingly, the advancing directions of the first front wheel 31 and the second front wheel 32 are changed.

When the three-wheel vehicle 1 is made to self-stand, for example, when the three-wheel vehicle 1 is parked, the driver operates the lever 73. When the lever 73 is operated, the calipers 72 reduce or prevent the movements of the first connection member 11 and the second connection member 12 relative to the head pipe 211. In this state, the movements of the first front wheel 31 and the second front wheel 32 relative to the head pipe 211 are reduced or prevented. Hence, the deformation of the link mechanism 5 is reduced or prevented. Since the deformation of the link mechanism 5 is reduced or prevented, the three-wheel vehicle 1 is reduced or prevented from being tilted further from the current state and is made to self-stand.

Some of the unique characteristics of the first preferred embodiment of the present invention will be described below.

According to the first preferred embodiment of the present invention, the three-wheel vehicle 1 is preferably made to self-stand by the operation of the lever 73, such that the three-wheel vehicle 1 is easily parked. According to the first preferred embodiment, when the three-wheel vehicle 1 is stopped, the relative movement between the first front wheel 31 and the second front wheel 32 is reduced or prevented, such that the driver stops the three-wheel vehicle 1 without letting his/her feet touch the ground.

According to the first preferred embodiment, the movements of the first front wheel 31 and the second front wheel 32 relative to the head pipe 211 are reduced or prevented in a state that the height position of the first front wheel 31 is different from the height position of the second front wheel 32, such that the three-wheel vehicle 1 is parked in a tilted state or in a state that one of the front wheels 3 is on a step.

In the three-wheel vehicle 1 according to the first preferred embodiment, a portion of the deformation suppressing mechanism 75 is disposed directly below the link mechanism 5. Specifically, in the three-wheel vehicle 1, the first connection member 11, the second connection member 12, and the suppressing mechanism 7 are positioned directly below the link mechanism 5. Hence, the center of gravity of the three-wheel vehicle 1 is lower than that in a configuration in which the deformation suppressing mechanism 75 is entirely disposed above the link mechanism 5. For this reason, the three-wheel vehicle 1 is less likely to become unstable.

In the three-wheel vehicle 1, the first connection member 11 is disposed at the first connection point 333c. In the three-wheel vehicle 1, the second connection member 12 is disposed at the second connection point 325c. Hence, even if the first front wheel 31 steers about the first center axis X and the second front wheel 32 steers about the second center axis Y, the positions of the first connection point 333c and the second connection point 325c relative to the head pipe 211 are unchanged. Therefore, the steering of the first front wheel 31 and the second front wheel 32 are not hindered by the first connection member 11 and the second connection member 12.

In the above-described preferred embodiment, when a steering member with the steering shaft 60 is turned, the first front rod 643, the second front rod 653, and the third front rod 663 are moved in the left-right direction in a front view of the vehicle while maintaining their postures directed in the front-rear direction. Hence, the moving amount of the first transmission member 67 in the left-right direction during the steering is reduced while a large steering angle is secured by individually providing turn shaft members with turning axes extending in the front-rear direction and turn shaft members with turning axes extending in the up-down direction. Accordingly, it is possible to provide a vehicle that reduces or prevents enlargement of the movable ranges of members that transmit a steering force while also providing a large steering angle.

In the above-described preferred embodiment, since the turning axes of the first cross member 51 and the second cross member 52 defining turnable members of the link mechanism 5 are disposed above the first front wheel 31 and the second front wheel 32, enlargement of the distance (tread) between the first front wheel 31 and the second front wheel 32 is reduced or prevented by the use of such a link mechanism 5. With this configuration, enlargement of the left-right direction length of the first transmission member 67 that transmits the steering force to the first front wheel 31 and the second front wheel 32 which is input to the steering shaft 60 via the handle bar 23 is reduced or prevented. Accordingly, it is possible to provide a vehicle that reduces or prevents enlargement of the movable ranges of members that transmit a steering force while also providing a large steering angle.

Second Preferred Embodiment

A vehicle according to a second preferred embodiment of the present invention will be described below referring to FIGS. 11 to 21.

In this preferred embodiment, as one example of a vehicle, a straddle type three-wheel vehicle (hereafter referred to as a vehicle) with two front wheels and one rear wheel, will be exemplified.

Figure 11:
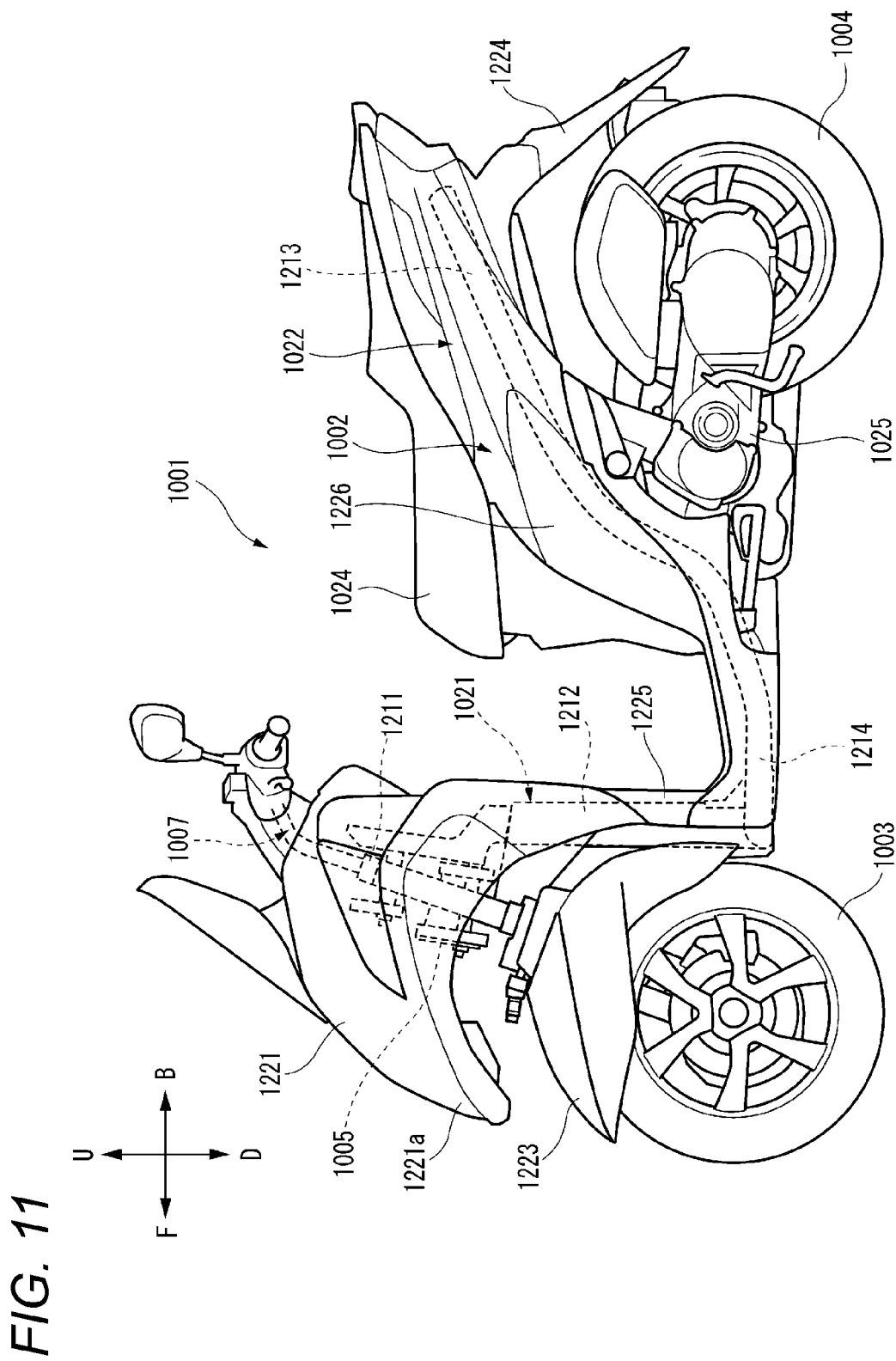
FIG. 11 is an overall side view illustrating a vehicle according to a second preferred embodiment of the present invention.

FIG. 11 is an overall side view showing the vehicle as viewed from the left side of the vehicle. In the following descriptions, an arrow F in the drawings indicates the frontward direction of the vehicle and an arrow B indicates the rearward direction of the vehicle. An arrow U indicates the upward direction of the vehicle and an arrow D indicates the downward direction of the vehicle. When the front-rear direction and the left-right direction are indicated in the descriptions, the directions denote the front-rear direction and the left-right direction as viewed from the driver on the vehicle. The center in the vehicle width direction denotes the center position of the vehicle in the vehicle width direction. Sideward in the vehicle width direction denotes a leftward direction or a rightward direction from the center of the vehicle in the vehicle width direction. The expression "an axis extending in the front-rear direction" does not necessarily mean only the case in which the axis is parallel or substantially parallel to the front-rear direction. The axis extending in the front-rear direction is an axis inclined in the range of about ±45 degrees, for example, relative to the front-rear direction. Similarly, the axis extending in the up-down direction is an axis inclined in the range of about ±45 degrees, for example, relative to the up-down direction. The axis extending in the left-right direction is an axis inclined in the range of about ±45 degrees, for example, relative to the left-right direction. In addition, the no-load state of the vehicle denotes a state in which no driver is on the vehicle, no fuel is in the vehicle, and the front wheels are in an upright state without being steered or tilted.

As illustrated in FIG. 11, a vehicle 1001 includes a vehicle body section 1002, a pair of left and right front wheels 1003 (see FIG. 12), a rear wheel 1004, a steering mechanism 1007, and a link mechanism 1005. The vehicle body section 1002 includes a vehicle body frame 1021, a vehicle body cover 1022, a seat 1024, and a power unit 1025.

The vehicle body frame 1021 includes a head pipe 1211, a down frame 1212, an under frame 1214, and a rear frame 1213. In FIG. 11, a portion of the vehicle body frame 1021 covered with the vehicle body cover 1022 is indicated in dashed lines. The vehicle body frame 1021 supports the power unit 1025, the seat 1024 and the like. The power unit 1025 includes a drive source, such as an engine or an electric motor, a transmission and the like.

The head pipe 1211 is disposed in the front portion of the vehicle 1001. The head pipe 1211 is disposed so as to be inclined by a predetermined angle relative to the vertical direction so that its upper portion is positioned behind its lower portion in a side view of the vehicle. The steering mechanism 1007 and the link mechanism 1005 are disposed around the periphery of the head pipe 1211. The steering shaft 1060 of the steering mechanism 1007 is turnably inserted into the head pipe 1211. The head pipe 1211 supports the link mechanism 1005.

The down frame 1212 is connected to the head pipe 1211. The down frame 1212 is disposed behind the head pipe 1211 and extends in the up-down direction. The under frame 1214 is connected to the lower portion of the down frame 1212. The under frame 1214 extends rearward from the lower portion of the down frame 1212. The rear frame 1213 is disposed behind the under frame 1214 so as to extend rearward and upward. The rear frame 1213 supports the seat 1024, the power unit 1025, a tail lamp and the like.

The vehicle body frame 1021 is covered with the vehicle body cover 1022. The vehicle body cover 1022 includes a front cover 1221, a pair of left and right front fenders 1223, a leg shield 1225, a center cover 1226, and a rear fender 1224.

The front cover 1221 is positioned directly ahead of the seat 1024. The front cover 1221 covers at least portions of the steering mechanism 1007 and the link mechanism 1005. The front cover 1221 includes a front portion 1221a disposed forward of the link mechanism 1005. The front portion 1221a of the front cover 1221 is provided above the front wheels 1003 in a side view of the vehicle 1001 in its no-load state. The front portion 1221a of the front cover 1221 is disposed behind the front ends of the front wheels 1003 in a side view of the vehicle 1001 in the no-load state. The leg shield 1225 is disposed directly below the front cover 1221 and directly ahead of the seat 1024. The center cover 1226 covers the periphery of the rear frame 1213.

The pair of left and right front fenders 1223 (see FIG. 12) is disposed directly below the front cover 1221 and directly above the pair of left and right front wheels 1003, respectively. The rear fender 1224 is disposed directly above a rear portion of the rear wheel 1004.

The pair of left and right front wheels 1003 is disposed directly below the head pipe 1211 and directly below the front cover 1221 in the no-load state. The rear wheel 1004 is disposed directly below the center cover 1226 and the rear fender 1224.

Figure 12:
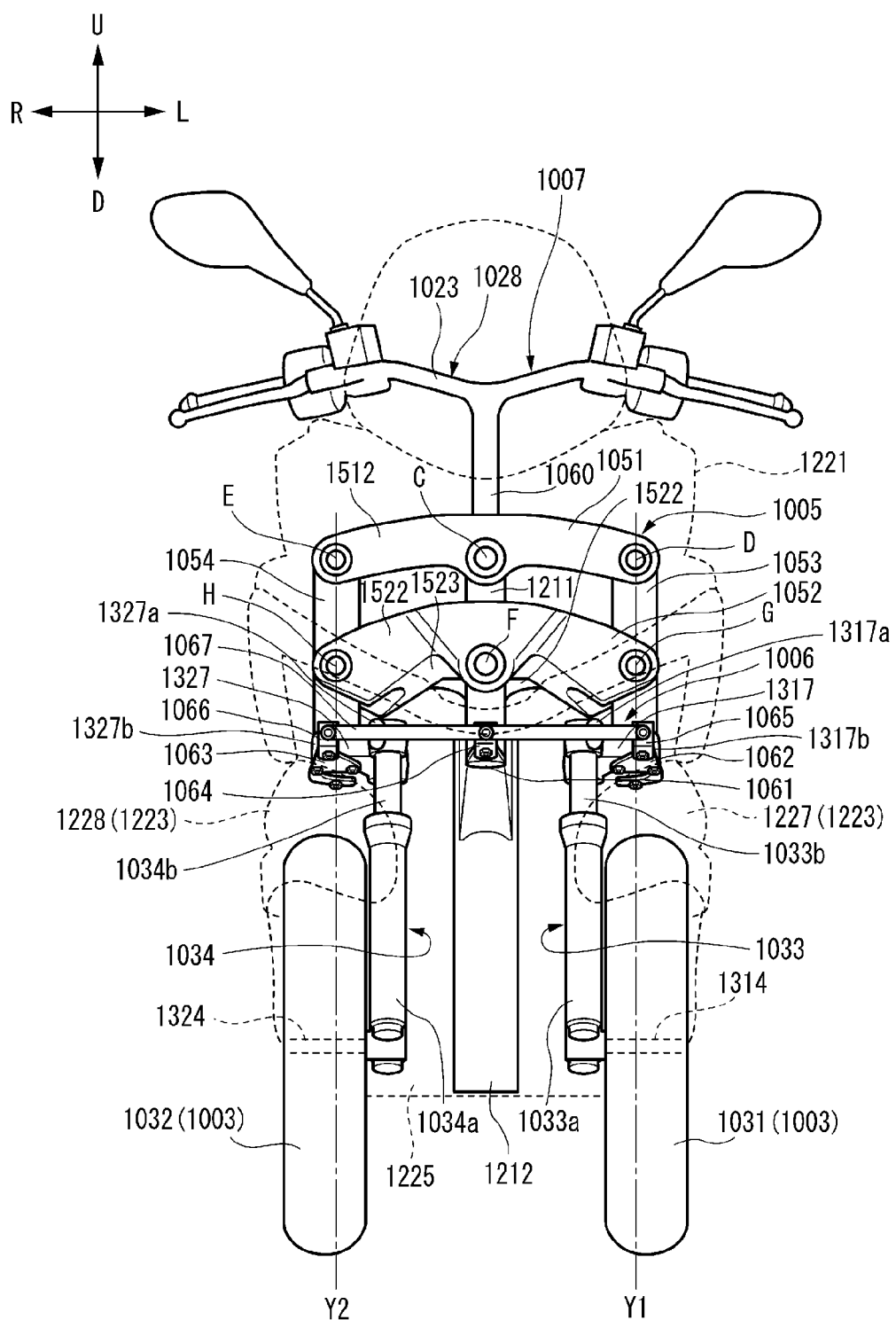
FIG. 12 is a front view illustrating a front portion of the vehicle of FIG. 11.
Figure 13:
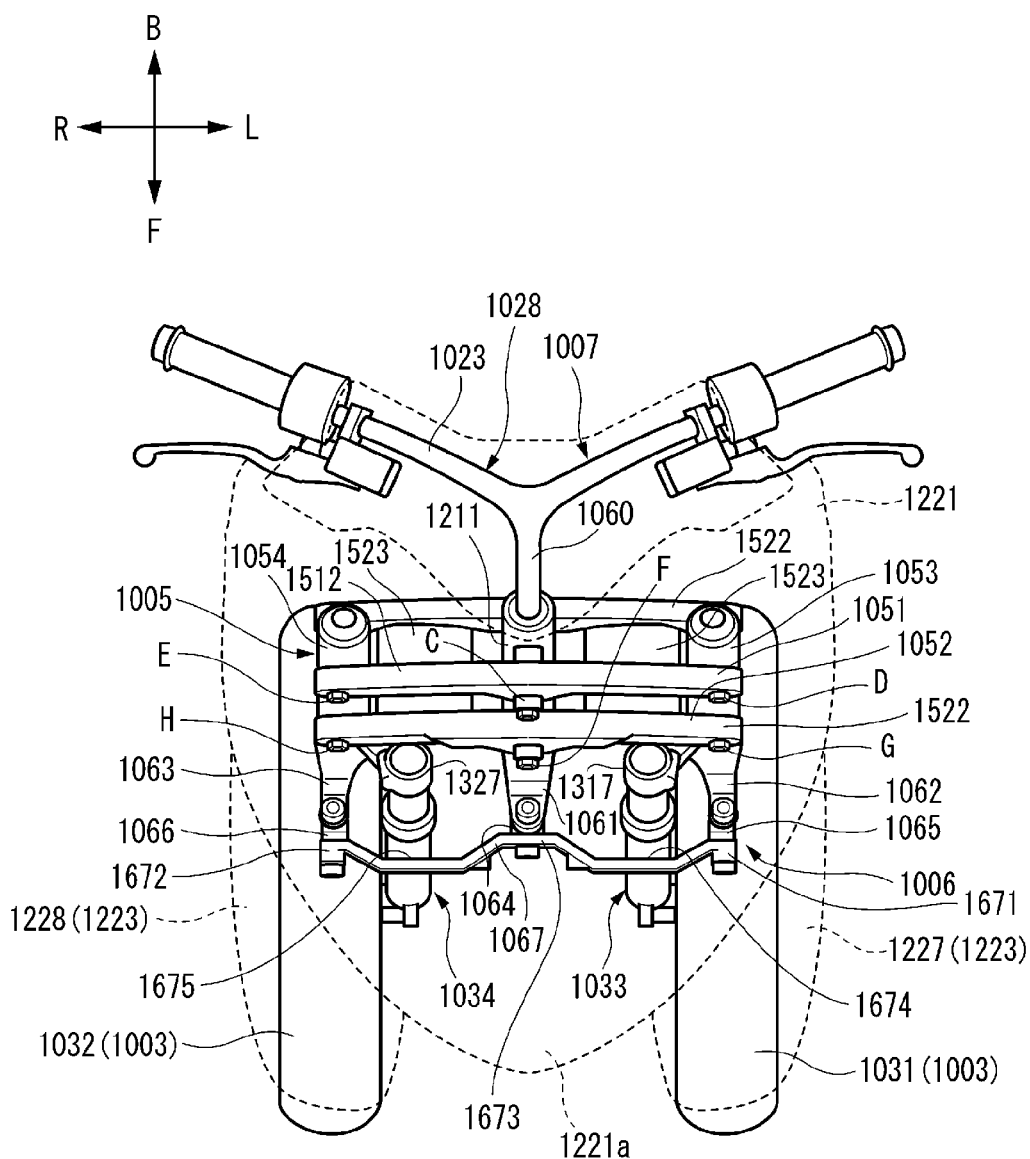
FIG. 13 is a plan view illustrating the front portion of the vehicle of FIG. 11.

FIG. 12 is a front view showing the front portion of the vehicle 1001 of FIG. 11 as viewed from the front. FIG. 13 is a plan view showing the front portion of the vehicle 1001 of FIG. 11 as viewed from above. FIG. 12 and FIG. 13 show the vehicle observed by seeing through the vehicle body cover 1022.

As illustrated in FIGS. 12 and 13, the steering mechanism 1007 includes a steering force transmitting mechanism 1006, a first shock absorber 1033, a second shock absorber 1034, and the pair of left and right front wheels 1003.

The pair of left and right front wheels 1003 includes a first front wheel 1031 and a second front wheel 1032. The first front wheel 1031 is disposed to the left of the center in the vehicle width direction. The second front wheel 1032 is disposed to the right of the center in the vehicle width direction. The first front wheel 1031 and the second front wheel 1032 are disposed symmetrically with each other relative to the center in the vehicle width direction. Furthermore, the first front fender 1227 of the pair of left and right front fenders 1223 is disposed directly above the first front wheel 1031. The second front fender 1228 of the pair of left and right front fenders 1223 is disposed directly above the second front wheel 1032. A first support device supports the first front wheel 1031. The first support device includes a first bracket 1317. The first support device includes the first bracket 1317 and the first shock absorber 1033. The first support device is turnable about the first center axis Y1 by the steering force transmitting mechanism. A second support device supports the second front wheel 1032. The second support device includes a second bracket 1327. The second support device includes the second bracket 1327 and the second shock absorber 1034. The second support device is turnable about the second center axis Y2 by the steering force transmitting mechanism. The first front wheel 1031 is supported by the first shock absorber 1033. The second front wheel 1032 is supported by the second shock absorber 1034.

The first shock absorber 1033 is preferably a so-called telescopic shock absorber, for example, and dampens vibrations from the road surface. The first shock absorber 1033 includes a first lower portion 1033a and a first upper portion 1033b. The first front wheel 1031 is supported on the first lower portion 1033a. The first lower portion 1033a extends in the up-down direction and a first axle 1314 is supported at its lower portion. The first axle 1314 supports the first front wheel 1031. The first upper portion 1033b is disposed directly above the first lower portion 1033a while a portion thereof is inserted into the first lower portion 1033a. The first upper portion 1033b is movable relative to the first lower portion 1033a in the extending direction of the first lower portion 1033a. The upper portion of the first upper portion 1033b is fixed to the first bracket 1317. The first bracket 1317 includes a first shock-absorber supporting section 1317a protruding toward the center of the vehicle 1001 and a first side-member supporting section 1317b positioned outward of the vehicle 1001 with respect to the first shock-absorber supporting section 1317a. The first upper portion 1033b of the first shock absorber 1033 is fixed to and supported by the first shock-absorber supporting section 1317a of the first bracket 1317. The lower portion of the first side turn shaft 1053 described below is connected to the first side-member supporting section 1317b of the first bracket 1317. In the first bracket 1317, the first shock-absorber supporting section 1317a is positioned on an imaginary plane passing through the first shock-absorber supporting section 1317b and orthogonal or substantially orthogonal to the extending direction of the first side member 1053.

The first lower portion 1033a and the first upper portion 1033b are connected to define two telescopic elements arranged in the front-rear direction and extending parallel or substantially parallel to each other. Hence, the first upper portion 1033b is reduced or prevented from turning relative to the first lower portion 1033a.

The second shock absorber 1034 is preferably a so-called telescopic shock absorber, for example, and dampens vibrations from the road surface. The second shock absorber 1034 includes a second lower portion 1034a and a second upper portion 1034b. The second front wheel 1032 is supported on the second lower portion 1034a. The second lower portion 1034a extends in the up-down direction and a second axle 1324 is supported at its lower portion. The second axle 1324 supports the second front wheel 1032. The second upper portion 1034b is disposed directly above the second lower portion 1034a while a portion thereof is inserted into the second lower portion 1034a. The second upper portion 1034b is movable relative to the second lower portion 1034a in the extending direction of the second lower portion 1034a. The upper portion of the second upper portion 1034b is fixed to the second bracket 1327. The second bracket 1327 includes a second shock-absorber supporting section 1327a protruding toward the center of the vehicle 1001 and a second side-member supporting section 1327b positioned outward of the vehicle 1001 with respect to the second shock-absorber supporting section 1327a. The second upper portion 1034b of the second shock absorber 1034 is fixed to and supported by the second shock-absorber supporting section 1327a of the second bracket 1327. The lower portion of a second side member 1054 described below is connected to the second side-member supporting section 1327b of the second bracket 1327. In the second bracket 1327, the second shock-absorber supporting section 1327a is positioned on an imaginary plane passing through the second side-member supporting section 1327b and orthogonal or substantially orthogonal to the extending direction of the second side member 1054.

The second lower portion 1034a and the second upper portion 1034b are connected to define two telescopic elements extending parallel or substantially parallel to each other and arranged in the front-rear direction. Hence, the second upper portion 1034b is reduced or prevented from turning relative to the second lower portion 1034a.

The steering force transmitting mechanism 1006 is disposed above the first front wheel 1031 and the second front wheel 1032. The steering force transmitting mechanism 1006 includes a steering member 1028 defining a member to which the steering force of the driver is input. The steering member 1028 includes the steering shaft 1060 and the handle bar 1023 connected to the upper portion of the steering shaft 1060. The steering shaft 1060 is disposed so that portion thereof is inserted into the head pipe 1211 and extends in the up-down direction, thus being turnable about a steering axis relative to the head pipe 1211. The steering shaft 1060 is turned in accordance with the operation of the handle bar 1023 by the driver.

Figure 14:
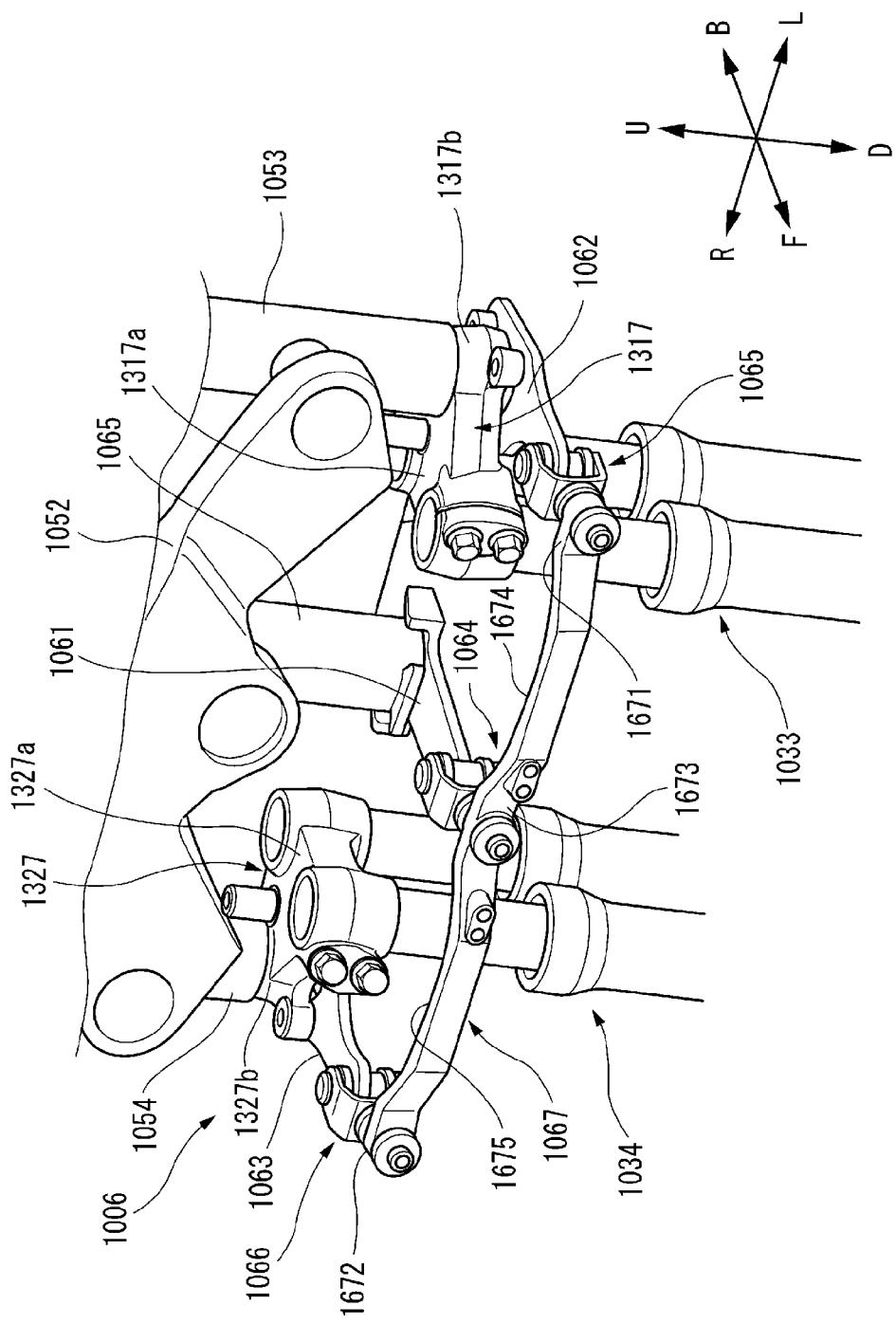
FIG. 14 is a perspective view illustrating the configuration of a portion of the steering force transmitting mechanism of the vehicle of FIG. 11.

FIG. 14 is a perspective view showing the configuration of a portion of the steering force transmitting mechanism 1006 of the vehicle 1001 of FIG. 11.

As illustrated in FIG. 14, the steering force transmitting mechanism 1006 includes a center transmission plate 1061 (one example of a center transmission portion), a left transmission plate 1062 (one example of a left transmission portion), a right transmission plate 1063 (one example of a right transmission portion), a center joint 1064, a left joint 1065, a right joint 1066, a tie rod 1067, the first bracket 1317, and the second bracket 1327, in addition to the steering member 1028. The steering force transmitting mechanism 1006 transmits the steering force exerted by the driver to operate the handle bar 1023 to the first bracket 1317 and the second bracket 1327 via these members.

The center transmission plate 1061 is disposed at the center in the vehicle width direction and connected to the steering shaft 1060 so that turning relative to the steering shaft 1060 is not allowed. The center transmission plate 1061 is turned in accordance with the turning of the steering shaft 1060.

The left transmission plate 1062 is connected to the first side member 1053 of the link mechanism 1005 described below so that turning relative to the first side member 1053 is not allowed. The left transmission plate 1062 is fixed to the first bracket 1317. The left transmission plate 1062 is positioned directly below the first bracket 1317. The left transmission plate 1062 is disposed directly to the left of the center transmission plate 1061.

The right transmission plate 1063 is connected to the second side member 1054 of the link mechanism 1005 described below so that turning relative to the second side member 1054 is not allowed. The left transmission plate 1062 and the right transmission plate 1063 are disposed symmetrically relative to the center of the center transmission plate 1061. The right transmission plate 1063 is fixed to the second bracket 1327. The right transmission plate 1063 is positioned directly below the second bracket 1327.

The tie rod 1067 is a plate-shaped member which extends in the left-right direction when it is disposed on the vehicle. The tie rod 1067 includes a first connecting section 1671, a second connecting section 1672, and a third connecting section 1673. The tie rod 1067 preferably has a shape in which the length M2 in the up-down direction is larger than the length M1 in the front-rear direction, in a cross sectional view perpendicular or substantially perpendicular to the longitudinal direction thereof (see FIG. 15). The first connecting section 1671 of the tie rod 1067 is connected to the first bracket 1317. The first connecting section 1671 is connected to the first bracket 1317 via the left joint 1065 and the left transmission plate 1062. The second connecting section 1672 of the tie rod 1067 is connected to the second bracket 1327. The second connecting section 1672 is connected to the second bracket 1327 via the right joint 1066 and the right transmission plate 1063. The third connecting section 1673 of the tie rod 1067 is connected to the lower portion of the steering shaft 1060 defining the steering member 1028. The third connecting section 1673 is connected to the center transmission plate 1061 fixed to the lower end portion of the steering shaft 1060 defining the steering member 1028.

Of the surfaces of the tie rod 1067, the rear surface located between the first connecting section 1671 and the third connecting section 1673 is defined as a first opposing surface 1674. The first opposing surface 1674 opposes the upper end portion of the first shock absorber 1033, in a plan view of the vehicle. The first opposing surface 1674 is curved such that a portion that is farther from the first connecting section 1671 and the third connecting section 1673 protrudes frontward. The first opposing surface 1674 is configured so to be spaced apart from the first shock absorber 1033. Of the surfaces defining the tie rod 1067, the rear surface located between the second connecting section 1672 and the third connecting section 1673 is defined as a second opposing surface 1675. The second opposing surface 1675 opposes the upper end portion of the second shock absorber 1034 in a plan view of the vehicle. The second opposing surface 1675 is curved such that a portion that is farther from the second connecting section 1672 and the third connecting section 1673 protrudes frontward. The second opposing surface 1675 is configured so as to be spaced apart from the second shock absorber 1034.

Figure 15:
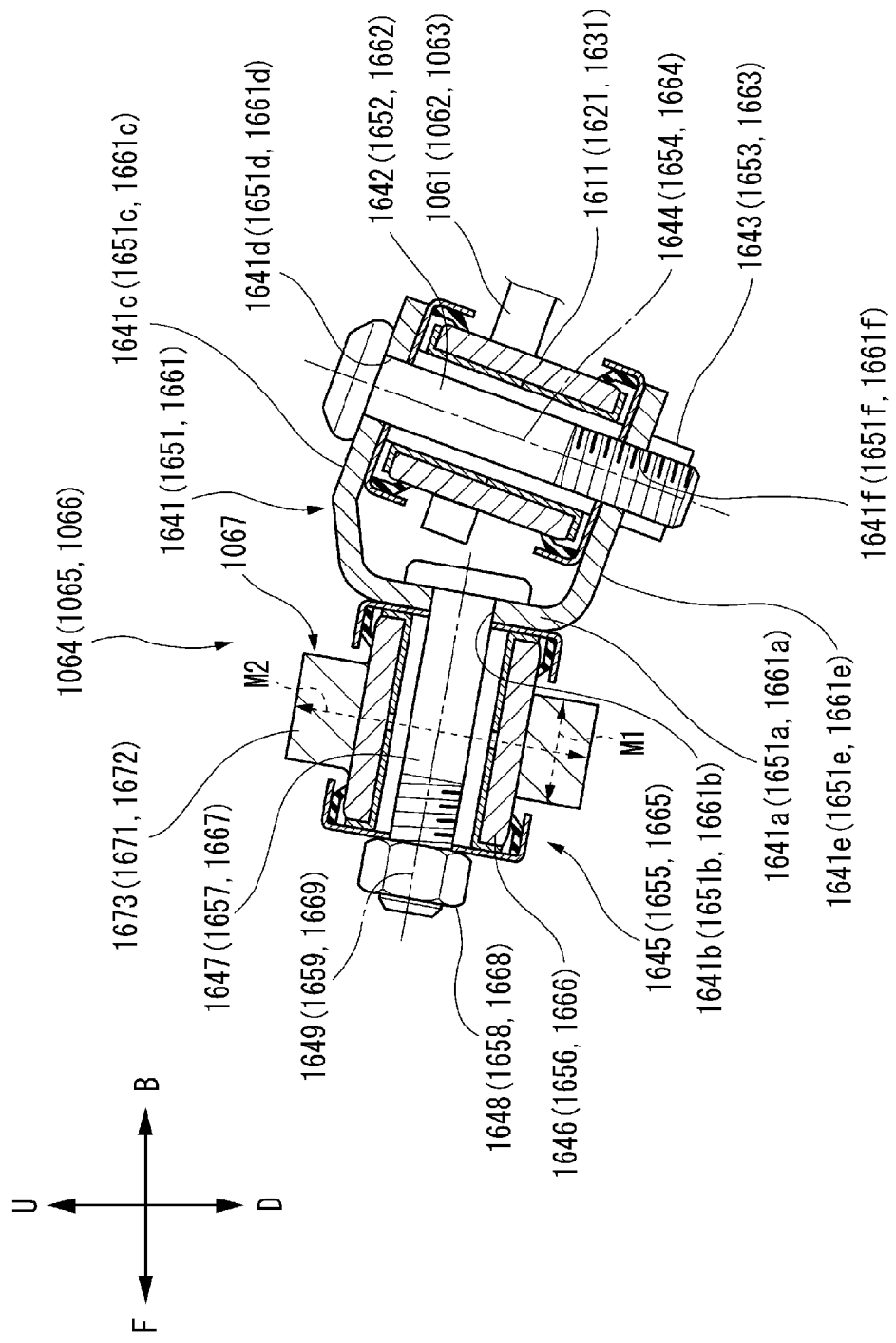
FIG. 15 is a sectional view illustrating the structure of a portion of the steering force transmitting mechanism of the vehicle of FIG. 11.

FIG. 15 is a sectional view showing the configuration of a portion of the steering force transmitting mechanism 1006 of the vehicle 1001 of FIG. 11. In FIG. 15, only the structure of the center portion of the steering force transmitting mechanism 1006 is illustrated, whereas the structures of the left and right portions of the steering force transmitting mechanism 1006 are not illustrated (only reference numerals are shown).

As illustrated in FIG. 15, the center joint 1064 is disposed at the front portion of the center transmission plate 1061. The center joint 1064 includes a first center turnable portion 1641 (one example of a first turnable portion) and a second center turnable portion 1645 (one example of a first supporting section). The first center turnable portion 1641 is supported at the tip end of the center transmission plate 1061. The first center turnable portion 1641 preferably has a U-shape in a side view. The first center turnable portion 1641 includes a support plate section 1641a. A through hole 1641b is provided in the support plate section 1641a of the first center turnable portion 1641. The first center turnable portion 1641 includes an upper fixing plate section 1641c extending rearward from the upper end of the support plate section 1641a. A through hole 1641d is provided in the upper fixing plate section 1641c. The first center turnable portion 1641 includes a lower fixing plate section 1641e extending rearward from the lower end of the support plate section 1641a. A through hole 1641f is provided in the lower fixing plate section 1641e. A center transmission cylinder section 1611 preferably having a cylindrical or substantially cylindrical shape is secured to the center transmission plate 1061 while its axis is directed in the up-down direction. A first center bolt 1642 passes through the center transmission cylinder section 1611. The first center bolt 1642 passes, from an upper side, through the through hole 1641d in the upper fixing plate section 1641c of the first center turnable portion 1641 and the through hole 1641f in the lower fixing plate section 1641e of the first center turnable portion 1641. A first center nut 1643 is threaded onto the first center bolt 1642 from a lower side. The first center turnable portion 1641 is connected to the center transmission cylinder section 1611 of the center transmission plate 1061 via the first center bolt 1642 and the first center nut 1643. The first center turnable portion 1641 is turnable relative to the center transmission plate 1061 about a first center turning axis 1644 (one example of a first up-down turning axis) that is the center axis of the first center bolt 1642 extending in the up-down direction. The first center turning axis 1644 is disposed parallel or substantially parallel to the turning axis of the steering shaft 1060.

The second center turnable portion 1645 is supported on the first center turnable portion 1641. The second center turnable portion 1645 includes a second center turn cylinder section 1646 preferably having a cylindrical or substantially cylindrical shape. The second center turn cylinder section 1646 is connected to a portion located directly ahead of the first center turnable portion 1641 while its axis is directed in the front-rear direction. A second center bolt 1647 passes through the second center turn cylinder section 1646. The second center bolt 1647 passes through the through hole 1641*b* of the support plate section 1641*a* of the first center turnable portion 1641 from a rear side. A second center nut 1648 is threaded onto the first center bolt 1647 from the front end of the second center turn cylinder section 1646. The second center turnable portion 1645 is connected to the first center turnable portion 1641 via the second center bolt 1647 and the second center nut 1648. The second center turnable portion 1645 is connected so as to be turnable relative to the first center turnable portion 1641 about a second center turning axis 1649 (one example of a first front-rear turning axis) that is the center axis of the second center bolt 1647 extending in the front-rear direction. The second center turning axis 1649 is disposed parallel or substantially parallel to a turning axis extending in the front-rear direction and connecting a first cross member 1051 and a second cross member 1052 defining members of the link mechanism 1005 described below so as to be turnable with each other.

The second center turn cylinder section 1646 of the second center turnable portion 1645 is fixed to the tie rod 1067. The third connecting section 1673 of the center portion of the tie rod 1067 is supported on the second center turnable portion 1645. The tie rod 1067 is turnable relatively about the second center turning axis 1649. Hence, the second center turnable portion 1645 supports the third connecting section 1673 defining the center section of the tie rod 1067 so as to be turnable relative to the first center turnable portion 1641 about the second center turning axis 1649.

The left joint 1065 is disposed at the front portion of the left transmission plate 1062. The left joint 1065 includes a first left turnable portion 1651 (one example of a second turnable portion) and a second left turnable portion 1655 (one example of a second supporting section). The first left turnable portion 1651 is supported at the tip end of the left transmission plate 1062. The first left turnable portion 1651 preferably has a U-shape in a side view. The first left turnable portion 1651 includes a support plate section 1651*a*. A through hole 1651*b* is provided in the support plate section 1651*a* of the first left turnable portion 1651. The first left turnable portion 1651 includes an upper fixing plate section 1651*c* extending rearward from the upper end of the support plate section 1651*a*. A through hole 1651*d* is provided in the upper fixing plate section 1651*c*. The first left turnable portion 1651 includes a lower fixing plate section 1651*e* extending rearward from the lower end of the support plate section 1651*a*. A through hole 1651*f* is provided in the lower fixing plate section 1651*e*. A left transmission cylinder section 1621 preferably having a cylindrical or substantially cylindrical shape is fixed to the left transmission plate 1062 while its axis is directed in the up-down direction. A first left bolt 1652 passes through the left transmission cylinder section 1621. The first left bolt 1652 passes, from an upper side, through the through hole 1651*d* in the upper fixing plate portion 1651*c* of the first left turnable portion 1651 and the through hole 1651*f* in the lower fixing plate portion 1651*e* of the first left turnable portion 1651. A first left nut 1653 is threaded onto the first left bolt 1652 from a lower side. The first left turnable portion 1651 is connected to the left transmission cylinder section 1621 of the left transmission plate 1062 via the first left bolt 1652 and the first left nut 1653. The first left turnable portion 1651 is connected so as to be turnable relative to the left transmission plate 1062 about a first left turning axis 1654 (one example of a second up-down turning axis) that is the center axis of the first left bolt 1652 extending in the up-down direction. The first left turning axis 1654 is disposed parallel or substantially parallel to the turning axis of the steering shaft 1060.

The second left turnable portion 1655 is supported on the first left turnable portion 1651. The second left turnable portion 1655 includes a second left turn cylinder section 1656 preferably having a cylindrical or substantially cylindrical shape. The second left turn cylinder section 1656 is connected to a portion located directly ahead of the first left turnable portion 1651 while its axis is directed in the front-rear direction. A second left bolt 1657 passes through the second left turn cylinder section 1656. The second left bolt 1657 passes through the through hole 1651*b* of the support plate section 1651*a* of the first left turnable portion 1651 from a rear side. A second left nut 1658 is threaded onto the first left bolt 1657 from the front end of the second left turn cylinder section 1656. The second left turnable portion 1655 is connected to the first left turnable portion 1651 via the second left bolt 1657 and the second left nut 1658. The second left turnable portion 1655 is turnable relative to the first left turnable portion 1651 about a second left turning axis 1659 (one example of a second front-rear turning axis) that is the center axis of the second left bolt 1657 extending in the front-rear direction. The second left turning axis 1659 is disposed parallel or substantially parallel to a turning axis extending in the front-rear direction and connecting the first cross member 1051 and the second cross member 1052 defining members of the link mechanism 1005 described below so as to be turnable with each other.

The second left turn cylinder section 1656 of the second left turnable portion 1655 is fixed to the tie rod 1067. The first connecting section 1671 which is a left portion of the tie rod 1067 is supported on the second left turnable portion 1655. The tie rod 1067 is turnable relatively about the second left turning axis 1659. As described above, the second left turnable portion 1655 supports the first connecting section 1671 on the left portion of the tie rod 1067 so that the first connecting section is turnable relative to the first left turnable portion 1651 about the second left turning axis 1659.

The right joint 1066 is disposed at the front portion of the right transmission plate 1063. The right joint 1066 includes a first right turnable portion 1661 (one example of a third turnable portion) and a second right turnable portion 1665 (one example of a third supporting section). The first right turnable portion 1661 is supported at the tip end of the right transmission plate 1063. The first right turnable portion 1661 preferably has a U-shape in a side view. The first right turnable portion 1661 includes a support plate section 1661*a*. A through hole 1661*b* is provided in the support plate section 1661*a* of the first right turnable portion 1661. The first right turnable portion 1661 includes an upper fixing plate section 1661*c* extending rearward from the upper end of the support plate section 1661*a*. A through hole 1661*d* is provided in the upper fixing plate section 1661*c*. The first right turnable portion 1661 includes a lower fixing plate section 1661*e* extending rearward from the lower end of the support plate section 1661*a*. A through hole 1661*f* is provided in the lower fixing plate section 1661*e*. A right transmission cylinder section 1631 preferably having a cylindrical or substantially cylindrical shape is fixed to the right transmission plate 1063 while its axis is directed in the up-down direction. A first right bolt 1662 passes through the right transmission cylinder section 1631. The first right bolt 1662 passes, from an upper side, through the through hole 1661*d* in the upper fixing plate section 1661*c* of the first right turnable portion 1661 and the through hole 1661*f* in the lower fixing plate section 1661*e* of the first right turnable portion 1661. A first right nut 1663 is threaded onto the first right bolt 1662 from a lower side. The first right turnable portion 1661 is connected to the right transmission cylinder section 1631 of the right transmission plate 1063 via the first right bolt 1662 and the first right nut 1663. The first right turnable portion 1661 is turnable relative to the right transmission plate 1063 about a first right turning axis 1664 (one example of a third up-down turning axis) that is the center axis of the first right bolt 1662 extending in the up-down direction. The first right turning axis 1664 is disposed parallel or substantially parallel to the turning axis of the steering shaft 1060.

The second right turnable portion 1665 is supported on the first right turnable portion 1661. The second right turnable portion 1665 includes a second right turn cylinder section 1666 preferably having a cylindrical or substantially cylindrical shape. The second right turn cylinder section 1666 is connected to a portion located directly ahead of the first right turnable portion 1661 while its axis is directed in the front-rear direction. A second right bolt 1667 passes through the second right turn cylinder section 1666. The second right bolt 1667 passes through the through hole 1661*b* of the support plate section 1661*a* of the first right turnable portion 1661 from a rear side. A second right nut 1668 is threaded onto the first right bolt 1667 from the front end of the second right turn cylinder section 1666. The second right turnable portion 1665 is connected to the first right turnable portion 1661 via the second right bolt 1667 and the second right nut 1668. The second right turnable portion 1665 is turnable relative to the first right turnable portion 1661 about a second right turning axis 1669 (one example of a third front-rear turning axis) that is the center axis of the second right bolt 1667 extending in the front-rear direction. The second right turning axis 1669 is disposed parallel or substantially parallel to a turning axis extending in the front-rear direction and connecting the first cross member 1051 and the second cross member 1052 defining members of the link mechanism 1005 described below so as to be turnable with each other.

The second right turn cylinder section 1666 of the second right turnable portion 1665 is fixed to the tie rod 1067. The second connecting section 1672 which is a right portion of the tie rod 1067 is supported on the second right turnable portion 1665. The tie rod 1067 is turnable relatively about the second right turning axis 1669. As described above, the second right turnable portion 1665 supports the second connecting section 1672 on the right portion of the tie rod 1067 so that the second connecting section is turnable relative to the first right turnable portion 1661 about the second right turning axis 1669.

The steering force transmitting mechanism 1006 configured as described above transmits the steering force transmitted from the steering member 1028 to the tie rod 1067 via the center transmission plate 1061 and the center joint 1064. Hence, the tie rod 1067 is displaced in either the left or right direction. The steering force transmitted to the tie rod 1067 is transmitted from the tie rod 1067 to the first bracket 1317 via the left joint 1065 and the left transmission plate 1062 and also transmitted to the second bracket 1327 from the tie rod 1067 to the second bracket 1327 via the right joint 1066 and the right transmission plate 1063. As a result, the first bracket 1317 and the second bracket 1327 are turned in the direction of displacement of the tie rod 1067.

In this example, the link mechanism 1005, a parallel four-bar link (also referred to as a parallelogram link) type, preferably is used.

The link mechanism 1005 is disposed below the handle bar 1023. The link mechanism 1005 is connected to the head pipe 1211 of the vehicle body frame 1021. The link mechanism 1005 includes the first cross member 1051, the second cross member 1052, the first side member 1053, and the second side member 1054, as a configuration that performs the tilting operation of the vehicle 1001. In addition, the link mechanism 1005 includes the first bracket 1317 and the first shock absorber 1033 as a configuration connected to a portion located directly below the first side member 1053 and titled together with the first side member 1053. Furthermore, the link mechanism 1005 includes the second bracket 1327 and the second shock absorber 1034 defining a configuration connected to a portion located directly below the second side member 1054 and titled together with the second side member 1054.

The first cross member 1051 includes a plate-shaped member 1512 disposed directly ahead of the head pipe 1211 and extending in the vehicle width direction. The plate-shaped member 1512 is supported on the head pipe 1211 at a supporting section C and is turnable relative to the head pipe 1211 about the turning axis of the supporting section C extending along the front-rear direction.

The left end of the first cross member 1051 is connected to the first side member 1053 via a connecting section D. The first cross member 1051 is turnable relative to the first side member 1053 about the turning axis extending in the front-rear direction of the supporting section D. The right end of the first cross member 1051 is connected to the second side member 1054 at a connecting section E. The first cross member 1051 is turnable relative to the second side member 1054 about the turning axis extending in the front-rear direction of the connecting section E.

The second cross member 1052 is supported on the head pipe 1211 at a supporting section F and is turnable about the turning axis extending in the front-rear direction of the supporting section F. The second cross member 1052 is disposed below the first cross member 1051. The first cross member 1051 and the second cross member 1052 preferably have the same or substantially the same length in the vehicle width direction and are parallel or substantially parallel to each other.

The second cross member 1052 includes a pair of plate-shaped members 1522 extending in the vehicle width direction. The head pipe 1211 is located between the pair of plate-shaped members 1512 in the front-rear direction. The pair of plate-shaped members 1522 is integrally connected to each other using an intermediate section 1523. The intermediate section 1523 may be integral with the pair of plate-shaped members 1522 or may be separate from these members. The left end of the second cross member 1052 is connected to the first side member 1053 at a connecting section G. The second cross member 1052 is turnable relative to the first side member 1053 about the turning axis of the connecting section G extending in the front-rear direction. The right end of the second cross member 1052 is connected to the second side member 1054 at a connecting section H. The second cross member 1052 is turnable relative to the second side member 1054 about the turning axis of the connecting section H extending in the front-rear direction.

The first side member 1053 is disposed directly to the left of the head pipe 1211 and extends parallel or substantially parallel to the extending direction of the head pipe 1211. The first side member 1053 is disposed directly above the first front wheel 1031 and above the first shock absorber 1033. The first side member 1053 is supported on the first side-member supporting section 1317*b* of the first bracket 1317 and disposed so as to be turnable relative to the first bracket 1317 about the first center axis Y1.

The second side member 1054 is disposed directly to the right of the head pipe 1211 and extends parallel or substantially parallel to the extending direction of the head pipe 1211. The second side member 1054 is disposed directly above the second front wheel 1032 and above the second shock absorber 1034. The second side member 1054 is supported on the second side-member supporting section 1327*b* of the second bracket 1327 and disposed so as to be turnable relative to the second bracket 1327 about the second center axis Y2.

As described above, the first cross member 1051, the second cross member 1052, the first side member 1053, and the second side member 1054 are connected so that the first cross member 1051 and the second cross member 1052 maintain postures that are parallel or substantially parallel to each other and so that the first side member 1053 and the second side member 1054 maintain postures that are parallel or substantially parallel to each other.

Figure 16:
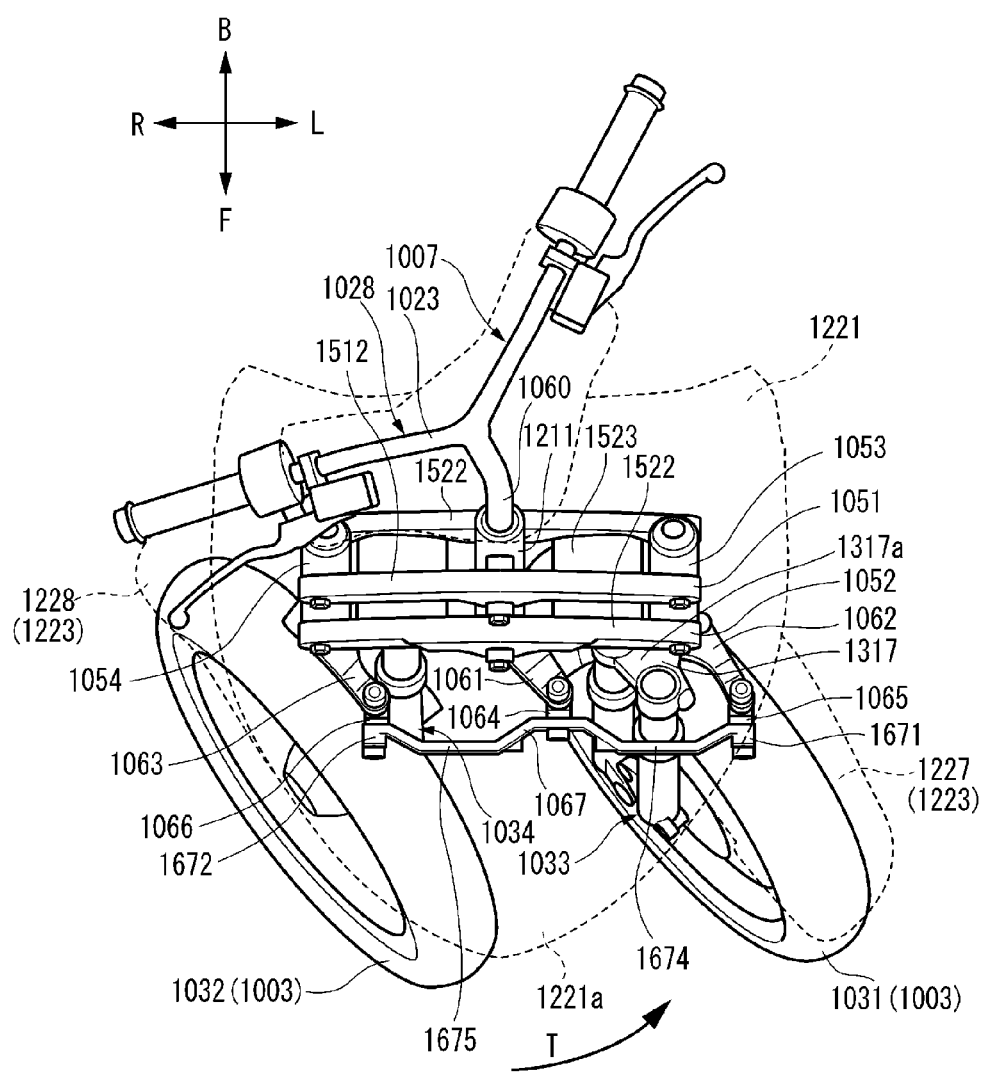
FIG. 16 is a plan view illustrating the front portion of the vehicle in a state that the vehicle of FIG. 11 is steered.

FIG. 16 is a view illustrating the steering operation of the vehicle 1001 and is a plan view showing the front portion of the vehicle in a state that the vehicle 1001 is steered.

As illustrated in FIG. 16, when the handle bar 1023 is steered in the left-right direction, the steering force transmitting mechanism 1006 of the steering mechanism 1007 is operated, and a steering operation is performed. When the steering shaft 1060 is turned by the steering of the handle bar 1023, the center transmission plate 1061 is turned in accordance with the turning of the steering shaft 1060.

For example, when the steering shaft 1060 is turned in the direction of the arrow T of FIG. 16, the tie rod 1067 is moved leftward and rearward in accordance with the turning of the center transmission plate 1061. Incidentally, the center transmission plate 1061 is turned relative to the center joint 1064 about a turning axis of the center joint 1064 extending in the up-down direction, such that the tie rod 1067 is moved leftward and rearward while maintaining its posture. As the tie rod 1067 is moved leftward and rearward, the left transmission plate 1062 and the right transmission plate 1063 are turned in the direction of the arrow T about the center of the first side member 1053 and the center of the second side member 1054, respectively. Incidentally, the left transmission plate 1062 is turned relative to the left joint 1065 about a turning axis of the left joint 1065 extending in the up-down direction, and the right transmission plate 1063 is turned relative to the right joint 1066 about a turning axis of the right joint 1066 extending in the up-down direction.

When the left transmission plate 1062 and the right transmission plate 1063 are turned in the direction of the arrow T, the first bracket 1317 and the second bracket 1327 are turned in the direction of the arrow T. When the first bracket 1317 and the second bracket 1327 are turned in the direction of the arrow T, the first front wheel 1031 is turned about the first center axis Y1 (see FIG. 12) via the first shock absorber 1033, and the second front wheel 1032 is turned about the second center axis Y2 (see FIG. 12) via the second shock absorber 1034.

Figure 17:
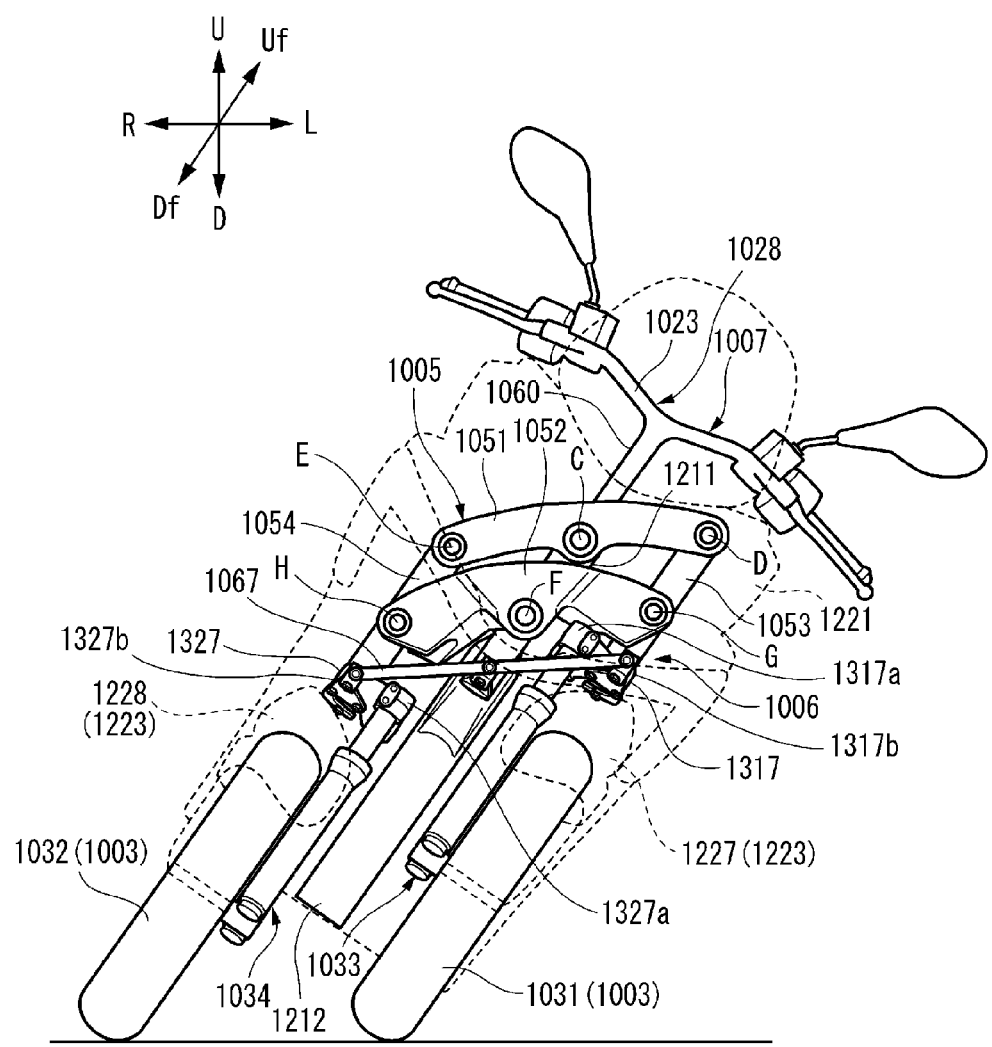
FIG. 17 is a front view illustrating the front portion of the vehicle in a state that the vehicle of FIG. 11 is tilted.

FIG. 17 is a view illustrating the tilting operation of the vehicle 1001 and is a plan view showing the front portion of the vehicle in a state that the vehicle 1001 is tilted.

As illustrated in FIG. 17, in accordance with the operation of the link mechanism 1005, the vehicle 1001 is tilted in the left-right direction. The operation of the link mechanism 1005 denotes that the respective members (the first cross member 1051, the second cross member 1052, the first side member 1053, and the second side member 1054) that perform the tilting operation in the link mechanism 1005 are turned relatively about their respective connection points, so that the shape of the link mechanism 1005 is changed.

In the link mechanism 1005 of this example, for example, in the upright state of the vehicle, the first cross member 1051, the second cross member 1052, the first side member 1053, and the second side member 1054 are disposed so as to define a rectangular or substantially rectangular shape in a front view, but in the tilted state of the vehicle 1001, the rectangular or substantially rectangular shape is deformed into a parallelogram. The link mechanism 1005 performs a tilting operation in cooperation with the relative turning operations of the first cross member 1051, the second cross member 1052, the first side member 1053, and the second side member 1054, thus tilting the first front wheel 1031 and the second front wheel 1032.

For example, when the driver tilts the vehicle 1001 leftward, the head pipe 1211 is tilted leftward relative to the vertical direction. When the head pipe 1211 is tilted, the first cross member 1051 is turned relative to the head pipe 1211 about the supporting section C and the second cross member 1052 is turned relative to the head pipe 1211 about the supporting section F. As a result, the first cross member 1051 is moved to the left of the second cross member 1052, such that the first side member 1053 and the second side member 1054 are tilted relative to the vertical direction while being parallel or substantially parallel to the head pipe 1211. When the first side member 1053 and the second side member 1054 are tilted, the first side member 1053 and the second side member 1054 are turned relative to the first cross member 1051 and the second cross member 1052. Therefore, when the vehicle 1001 is tilted, the first front wheel 1031 and the second front wheel 1032 supported on the first side member 1053 and the second side member 1054 are respectively tilted relative to the vertical direction while being parallel or substantially parallel to the head pipe 1211 in accordance with the tilting of the first side member 1053 and the second side member 1054.

Furthermore, when the tilting operation is performed, the tie rod 1067 is turned about the second center turning axis 1649 of the center joint 1064, the second left turning axis 1659 of the left joint 1065, and the second right turning axis 1669 of the right joint 1066, which extend in the front-rear direction (see FIG. 14 and FIG. 15). As a result, the tie rod 1067 maintains its posture that is parallel or substantially parallel to the first cross member 1051 and the second cross member 1052 even when the vehicle 1001 is tilted.

As described above, the link mechanism 1005 that tilts the first front wheel 1031 and the second front wheel 1032 by performing the tilting operation is disposed above the first front wheel 1031 and the second front wheel 1032. In other words, the turning axes of the first cross member 1051, the second cross member 1052, the first side member 1053, and the second side member 1054 defining turnable members of the link mechanism 1005 are disposed above the first front wheel 1031 and the second front wheel 1032. The up-down direction of the vehicle body frame in a state in which the vehicle is tilted in the left-right direction is different from the vertical direction and denotes the up-down direction of the head pipe 1211 tilted in the left-right direction. For example, the sign Uf illustrated in FIG. 17 and FIG. 18 indicates an upward direction in the up-down direction of the vehicle body frame, and the sign Df indicates a downward direction in the up-down direction of the vehicle body frame.

Figure 18:
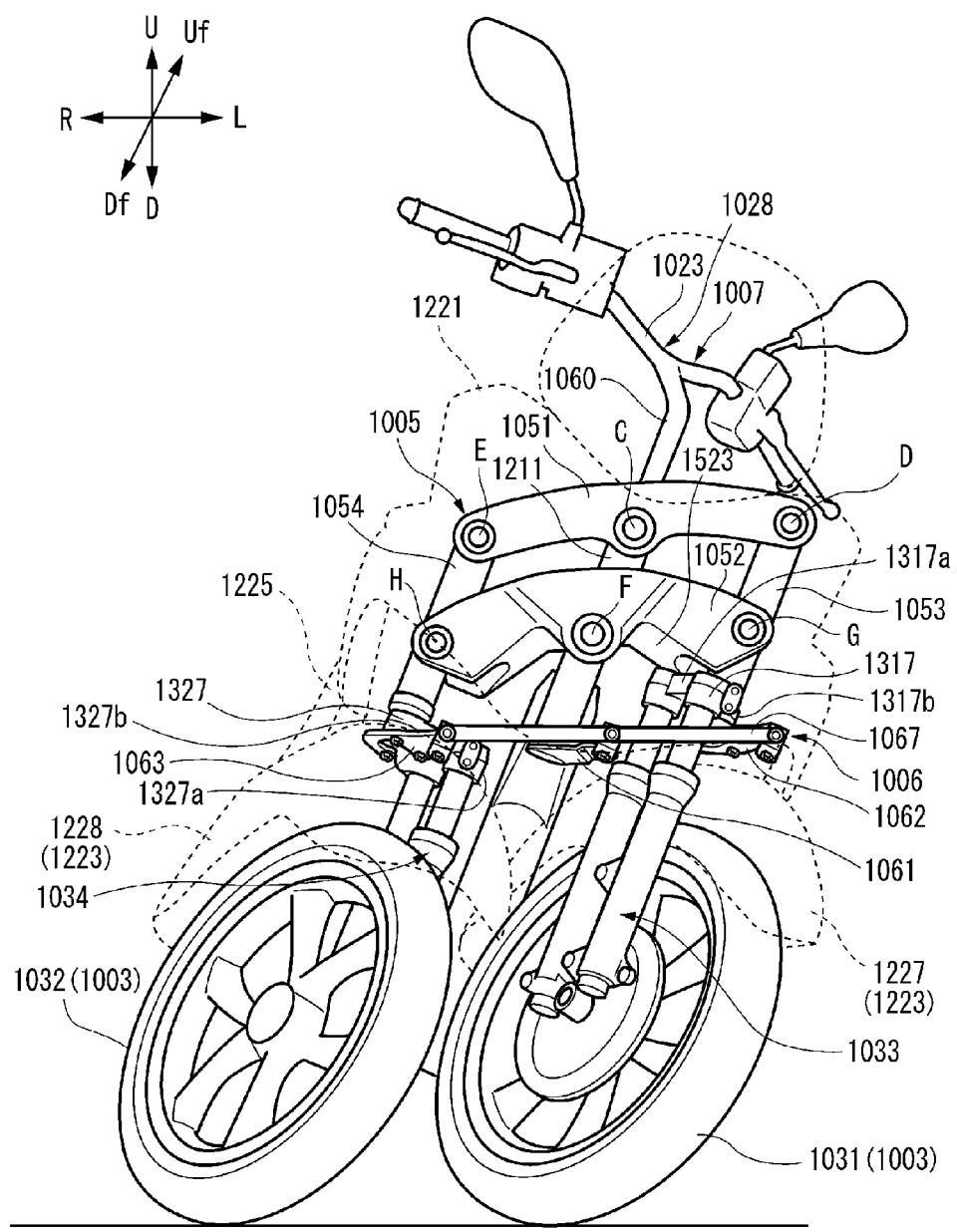
FIG. 18 is a front view illustrating the front portion of the vehicle in a state that the vehicle of FIG. 11 is steered and tilted.

FIG. 18 is a front view showing the front portion of the vehicle in a state that the vehicle 1001 is steered and tilted.

FIG. 18 illustrates a state that the vehicle is steered leftward and tilted leftward. When the turning operation of the vehicle is performed as illustrated in FIG. 18, the directions of the first front wheel 1031 and the second front wheel 1032 are changed by the steering operation, while the first front wheel 1031 and the second front wheel 1032 are tilted together with the vehicle body frame 1021 by the tilting operation. In this state, the shape defined by the first cross member 1051, the second cross member 1052, the first side member 1053, and the second side member 1054 of the link mechanism 1005 is deformed so as to be almost a parallelogram, such that the tie rod 1067 is moved rearward and either leftward or rightward (leftward in FIG. 18) which is in accordance with the direction of the steering operation.

The tie rod 1067 is configured to move in a direction parallel or substantially parallel to the extending directions of the first cross member 1051 and the second cross member 1052 as viewed from the axial directions of the supporting section C and the connecting sections D, E defining the turning axes of the first cross member 1051 or as viewed from the axial directions of the supporting section F and the connecting sections G, H defining the turning axes of the second cross member 1052. Specifically, the tie rod 1067 is configured to move such that the lines passing through the turning axis 1649 of the support position at the center joint 1064, the turning axis 1659 of the support position at the left joint 1065, and the turning axis 1669 of the support position at the right joint 1066 are parallel or substantially parallel to the lines passing through the support positions C, D and E of the first cross member 1051 and the lines passing through the support positions F, G and H of the second cross member 1052 (see FIG. 12 and FIGS. 16 to 18).

The tie rod 1067 is disposed below the first cross member 1051 and the second cross member 1052 (see FIG. 12). The tie rod 1067 is disposed at a position in which the tie rod overlaps with at least one of the first shock-absorber supporting section 1317*a* of the first bracket 1317 and the first shock absorber 1033 as viewed from the front of the vehicle in at least the fully tilted state when the link mechanism 1005 is fully tilted leftward (see FIG. 17). The tie rod 1067 is disposed at a position in which the tie rod overlaps with at least one of the second shock-absorber supporting section 1327*a* of the second bracket 1327 and the second shock absorber 1034 as viewed from the front of the vehicle in at least the fully tilted state when the link mechanism 1005 is fully tilted rightward.

The tie rod 1067 is disposed at a position in which a portion thereof overlaps with the first shock-absorber supporting section 1317*a* of the first bracket 1317 and the second shock-absorber supporting section 1327*a* of the second bracket 1327 as viewed from the front of the vehicle in the no-load state of the vehicle 1001 (see FIG. 12).

In the no-load state of the vehicle 1001, the first side-member supporting section 1317*b* is positioned on an imaginary plane through which the first shock-absorber supporting section 1317*a* of the first bracket 1317 passes and is orthogonal or substantially orthogonal to the extending direction of the first side member 1053. In the no-load state of the vehicle 1001, the second side-member supporting section 1327*b* is positioned on an imaginary plane through which the second shock-absorber supporting section 1327*a* of the second bracket 1327 passes and is orthogonal or substantially orthogonal to the extending direction of the second side member 1054.

FIG. 19 is a view illustrating the movements of the steering force transmitting mechanism, the first front wheel 1031, and the second front wheel 1032 of the vehicle 1001 illustrated in FIG. 11. FIG. 19A is a schematic view during straight traveling and FIG. 19B is a schematic view during left turning.

As illustrated in FIG. 19A, in the steering force transmitting mechanism 1006, the distance La in the left-right direction between the first left turning axis 1654 and the first right turning axis 1664 is larger than the distance Lb in the left-right direction between the first center axis Y1 defining the turning axis of the first bracket 1317 and extending in the up-down direction, and the second center axis Y2 defining the turning axis of the second bracket 1327 and extending in the up-down direction.

As illustrated in FIG. 19B, when the vehicle 1001 is steered leftward, the left turning is performed such that the first front wheel 1031 closer to the turning center is the inner wheel, and such that the second front wheel 1032 spaced apart from the turning center is the outer wheel. In this manner, when the vehicle is turned to the left, the first front wheel 1031 closer to the turning center is the inner wheel and is tilted by an inner wheel steering angle $\theta\alpha$ relative to a vehicle center axis F1 extending in the front-rear direction of the vehicle 1001, and the second front wheel 1032 spaced apart from the turning center is the outer wheel and is tilted by an outer wheel steering angle $\theta\beta$ relative to the vehicle center axis F1 extending in the front-rear direction of the vehicle 1001. Incidentally, in the vehicle 1001, the inner wheel steering angle $\theta\alpha$ of the first front wheel 1031 defining the inner wheel is larger than the outer wheel steering angle $\theta\beta$ of the second front wheel 1032 defining the outer wheel. Similarly, in the vehicle 1001, when the vehicle 1001 is steered rightward, the right turning is performed such that the second front wheel 1032 closer to the turning center is the inner wheel and such that the first front wheel 1031 spaced apart from the turning center is the outer wheel. In this manner, when the vehicle is turned to the right, the second front wheel 1032 closer to the turning center is the inner wheel and is tilted by the inner wheel steering angle $\theta\alpha$ relative to the vehicle center axis F1 extending in the front-rear direction of the vehicle 1001, and the first front wheel 1031 spaced apart from the turning center is the outer wheel and is tilted by the outer wheel steering angle $\theta\beta$ relative to the vehicle center axis F1 extending in the front-rear direction of the vehicle 1001. Incidentally, the inner wheel steering angle $\theta\alpha$ of the second front wheel 1032 defining the inner wheel is larger than the outer wheel steering angle $\theta\beta$ of the first front wheel 1031 defining the outer wheel.

As described above, in the vehicle 1001, relative to the vehicle center axis F1 extending in the front-rear direction of the vehicle 1001, the inner wheel steering angle $\theta\alpha$ of the front wheel disposed inward when the steering is performed (i.e., one of the first front wheel 1031 and the second front wheel 1032) is larger than the outer wheel steering angle $\theta\beta$ of the front wheel disposed outward at the time of the steering (i.e., the other one of the first front wheel 1031 and the second front wheel 1032).

Figure 20:
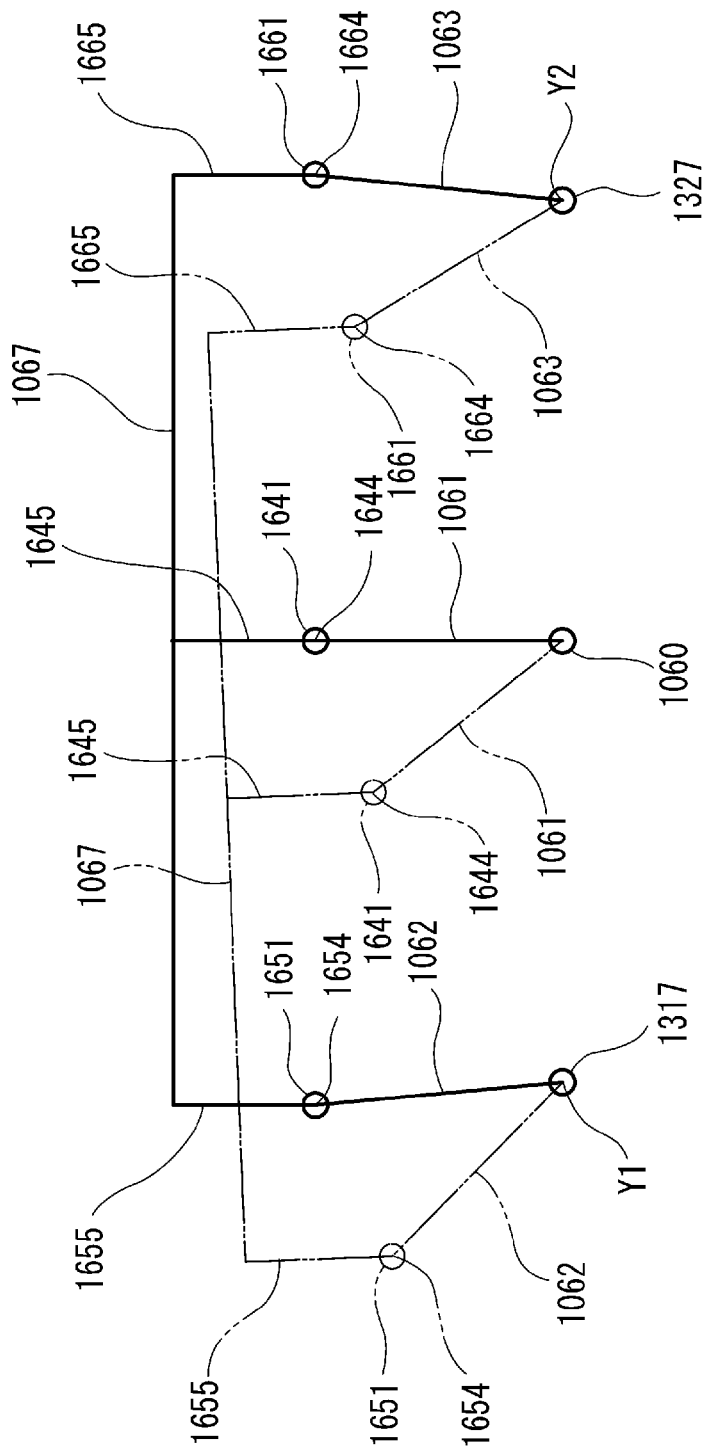
FIG. 20 is a schematic view illustrating the movement of a portion of the steering force transmitting mechanism of the vehicle of FIG. 11.

FIG. 20 is a schematic view illustrating the movement of a portion of the steering force transmitting mechanism 1006 of the vehicle 1 of FIG. 11. In FIG. 20, the state during the straight traveling of the vehicle is indicated in solid lines, and the state during the turning of the vehicle is indicated in dashed chain lines.

As illustrated in FIG. 20, in the above-described preferred embodiment, when the steering member 1028 is turned, the center transmission plate 1061 that is configured to not turn relative to the steering shaft 1060 defining the steering member 1028 is turned about the turning axis of the steering member 1028 in cooperation with the turning of the steering member 1028. At this time, the first center turnable portion 1641 supported on the center transmission plate 1061 is turned relative to the center transmission plate 1061 about the first center turning axis 1644, and the second center turnable portion 1645 connected to a portion located directly ahead of the first center turnable portion 1641 is moved to one side in the left-right direction in a front view of the vehicle, while maintaining its posture directed in the front-rear direction. The tie rod 1067 supported on the second center turnable portion 1645 is moved to one side in the left-right direction in cooperation with the movement of the second center turnable portion 1645 in the left-right direction. In accordance with the movement of the tie rod 1067 in the left-right direction, the second left turnable portion 1655 and the second right turnable portion 1665 are moved to one side in the left-right direction while maintaining their postures with respect to the front-rear direction of the vehicle 1001. In accordance with the movement in the left-right direction of the second left turnable portion 1655, the first left turnable portion 1651 is moved to one side in the left-right direction while turning about the first left turning axis 1654 relative to the left transmission plate 1062. Hence, the steering force is transmitted to the first bracket 1317 via the left transmission plate 1062, and the first bracket 1317 is turned about the first center axis Y1 defining the turning axis extending in the up-down direction. Similarly, in accordance with the movement in the left-right direction of the second right turnable portion 1665, the first right turnable portion 1661 is moved to one side in the left-right direction while turning about the first right turning axis 1664 relative to the right transmission plate 1063. Hence, the steering force is transmitted to the second bracket 1327 via the right transmission plate 1063, and the second bracket 1327 is turned about the second center axis Y2 defining the turning axis extending in the up-down direction.

As described in the above-described preferred embodiment, when the steering member 1028 is turned, the second center turnable portion 1645, the second left turnable portion 1655, and the second right turnable portion 1665 are moved in the left-right direction in a front view of the vehicle while maintaining their postures directed in the front-rear direction. Hence, since the moving amount of the tie rod 1067 in the left-right direction during steering is reduced while a large steering angle is secured by individually providing the turn shaft members with the turning axes extending in the front-rear direction and the turn shaft members with the turning axes extending in the up-down direction, the movable range of the tie rod 1067 during the steering as viewed from above of the vehicle is reduced. As a result, it is possible to provide a vehicle in which enlargement of the front portion of the vehicle 1001 is reduced or prevented while a large steering angle is secured.

Figure 21:
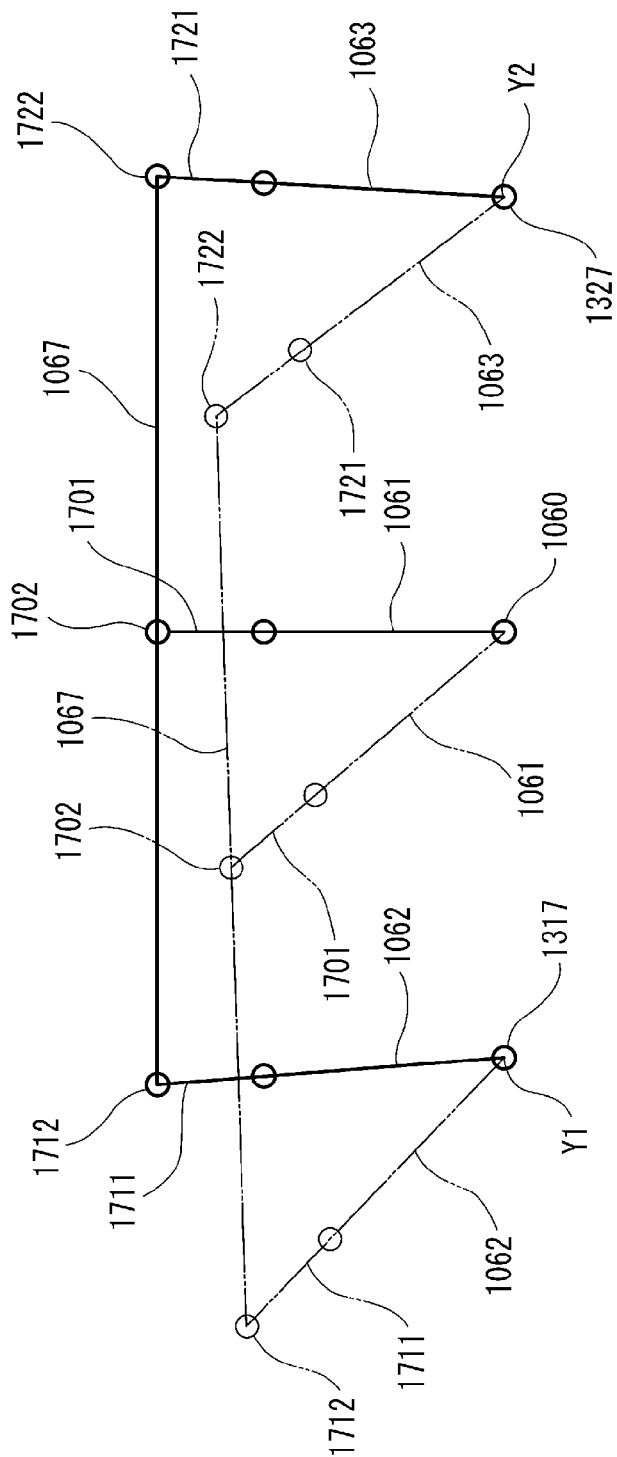
FIG. 21 is a schematic view illustrating the configuration and the movement of a steering force transmitting mechanism having a single-axis structure.

FIG. 21 is a schematic view illustrating the configuration and the movement of a steering force transmitting mechanism according to a comparison example. In FIG. 21, the state during the straight traveling is indicated in solid lines, and the state during the turning is indicated in dashed chain lines.

As illustrated in FIG. 21, in the steering force transmitting mechanism having a single-axis structure, a first center turnable portion 1701, a first left turnable portion 1711, and a first right turnable portion 1721 which are turnable about the axes extending in the horizontal direction are provided as the center transmission plate 1061, the left transmission plate 1062, and the right transmission plate 1063, respectively. At the tip ends of the first center turnable portion 1701, the first left turnable portion 1711, and the first right turnable portion 1721, a second center turnable portion 1702, a second left turnable portion 1712, and a second right turnable portion 1722 which are turnable about the axes extending in the up-down direction are provided. The second center turnable portion 1702, the second left turnable portion 1712, and the second right turnable portion 1722 are connected to the tie rod 1067 extending in the left-right direction so as to be turnable relative to the tie rod 1067. In comparison with the mechanism illustrated in FIG. 20, in the steering force transmitting mechanism illustrated in FIG. 21, the tie rod 1067 extending in the left-right direction is moved largely in the left-right direction in accordance with the turning of the first center turnable portion 1701, the first left turnable portion 1711, and the first right turnable portion 1721. As a result, in a vehicle including the steering force transmitting mechanism having this configuration, the movable range of the tie rod 1067 becomes large during steering as viewed from above of the vehicle.

On the other hand, in the above-described preferred embodiments, the moving amount of the tie rod 1067 in the left-right direction during steering is reduced while a large steering angle is secured by individually providing the turn shaft members with the turning axes extending in the front-rear direction and the turn shaft members with the turning axes extending in the up-down direction, such that enlargement of the movable range of the tie rod 1067 is reduced or prevented. As a result, in the above-described preferred embodiments, enlargement of the movable range of the tie rod 1067 is reduced or prevented while a large steering angle is secured. In addition, enlargement of the front portion of the vehicle 1001 is also reduced or prevented.

In the above-described preferred embodiments, since the turning axes of the first cross member 1051 and the second cross member 1052 defining turnable members of the link mechanism 1005 are disposed above the first front wheel 1031 and the second front wheel 1032, enlargement of the distance (tread) between the first front wheel 1031 and the second front wheel 1032 due to the disposition of the link mechanism 1005 is reduced or prevented. With this configuration, enlargement of the left-right length of the tie rod 1067 that transmits the steering force to the first front wheel 1031 and the second front wheel 1032 which is input to the steering shaft 1060 is reduced or prevented. Accordingly, it is possible to provide a vehicle that reduces or prevents enlargement of the movable ranges of members that transmit a steering force while assuring a large steering angle.

In the above-described preferred embodiments, the distance La in the left-right direction between the first left turning axis 1654 and the first right turning axis 1664 is larger than the distance Lb in the left-right direction between the first center axis Y1 defining the turning axis of the first bracket 1317 and extending in the up-down direction, and the second center axis Y2 defining the turning axis of the second bracket 1327 and extending in the up-down direction. Hence, during steering, the first front wheel 1031 and the second front wheel 1032 are set to postures in which the Ackermann geometry is easily established. Hence, even when a large steering is performed, the turning radius of the first front wheel 1031 is close to that of the second front wheel 1032. For this reason, the first front wheel 1031 and the second front wheel 1032 are steered smoothly about the first axle 1314 and the second axle 1324. As a result, the riding comfort level of the vehicle 1001 is improved.

In the above-described preferred embodiments, one example of the steering force transmitting mechanism 1006 is disclosed in which the tie rod 1067 is respectively supported by front portions of the center transmission plate 1061, the left transmission plate 1062, and the right transmission plate 1063 via the center joint 1064, the left joint 1065, and the right joint 1066. However, the mechanism is not limited to this example. For example, the steering force transmitting mechanism 1006 may be configured so that the tie rod 1067 is respectively supported by rear portions of the center transmission plate 1061, the left transmission plate 1062, and the right transmission plate 1063 via the center joint 1064, the left joint 1065, and the right joint 1066.

Furthermore, as illustrated in FIGS. 20 and 21, in the configuration in which the first center turnable portion 1641 and the second center turnable portion are disposed so as to be arranged in the front-rear direction, the length of the configuration that supports the tie rod 1067 in the front-rear direction becomes large. However, in this example, as illustrated in FIG. 20, the second center turnable portion 1645 is connected to the front portion of the first center turnable portion 1641, the second left turnable portion 1655 is connected to the front portion of the first left turnable portion 1651, and the second right turnable portion 1665 is connected to the front portion of the first right turnable portion 1661. In this configuration, when the steering member 1028 is turned, the second center turnable portion 1645, the second left turnable portion 1655, and the second right turnable portion 1665 are moved in the left-right direction in a front view of the vehicle while maintaining their postures directed in the front-rear direction. For this reason, the distance from the tie rod 1067 in the front-rear direction of the vehicle to each of the steering shaft 1060, the first center axis Y1 (defining the turning axis of the first bracket 1317 and extending in the up-down direction), and the second center axis Y2 (defining the turning axis of the second bracket 1327 and extending in the up-down direction) becomes large. However, since the moving amount of the tie rod 1067 in the left-right direction is reduced as described above, the movable range thereof is reduced or prevented. Furthermore, in the above-described preferred embodiments, predetermined distances (clearances) are secured between the tie rod 1067 and the link mechanism 1005 as well as between the tie rod 1067 and the two front wheels (1031, 1032). Hence, the movable range of the tie rod 1067 is reduced while the clearances from the link mechanism 1005 and the two front wheels (1031, 1032) are secured. Moreover, since the movable range of the tie rod 1067 is defined at a low position in a front view of the vehicle, the space above the tie rod 1067 is used as a space to accommodate vehicle-mounted components, such as auxiliary devices.

Furthermore, a configuration is exemplified in which the second center turnable portion 1645 is connected to the front portion of the first center turnable portion 1641, the second center turnable portion 1655 is connected to the front portion of the first left turnable portion 1651, and the second right turnable portion 1665 is connected to the front portion of the first right turnable portion 1661. However, the present invention is not limited to the configuration exemplified above. For example, the second center turnable portion 1645 may be connected to the upper portion of the first center turnable portion 1641, the second center turnable portion 1655 may be connected to the upper portion of the first left turnable portion 1651, and the second right turnable portion 1665 may be connected to the upper portion of the first right turnable portion 1661. Furthermore, the second center turnable portion 1645 may be connected to the lower portion of the first center turnable portion 1641, the second center turnable portion 1655 may be connected to the lower portion of the first left turnable portion 1651, and the second right turnable portion 1665 may be connected to the lower portion of the first right turnable portion 1661.

Moreover, the tie rod 1067 is preferably a plate-shaped member extending in the left-right direction and the length M2 thereof in the up-down direction is larger than the length M1 thereof in the front-rear direction. With this configuration, the moving amount of the tie rod 1067 in the front-rear direction during steering is smaller than when the length M1 in the front-rear direction is larger, while the rigidity of the tie rod 1067 is secured so that the steering force is transmitted, such that the movable range of the tie rod 1067 is further reduced.

Since the vehicle body frame 1021 is disposed directly behind the steering member 1028, by disposing the tie rod 1067 in the front side of the steering turning axis, enlargement of the front portion of the vehicle 1001 is further reduced or prevented. However, when the tie rod 1067 is disposed directly ahead of the steering turning axis, in order to establish the Ackermann geometry, it is necessary to make the distance between the respective supporting sections that support both ends of the tie rod 1067 longer than the distance between the first bracket 1317 and the second bracket 1327 that support the first front wheel 1031 and the second front wheel 1032. Since both end portions of the tie rod 1067 are positioned further outward in the left-right direction, the vehicle is enlarged. However, in the configuration described above, a two-axis structure is used in which the second center turning axis 1649, the second left turning axis 1659, and the second right turning axis 1669 defining front-rear direction axes are provided at the tip ends of the first center turning axis 1644, the first left turning axis 1654, and the first right turning axis 1664 defining up-down direction axes, and the tie rod 1067 is supported on the second center turning axis 1649, the second left turning axis 1659, and the second right turning axis 1669. With this configuration, the moving amount of the tie rod 1067 in the left-right direction during the steering is reduced, such that a configuration taking account of the Ackermann geometry is easily achieved.

In addition, the steering angle of the handle bar cannot be large in a steering force transmitting mechanism that is configured to support a tie rod using a universal joint instead of using a two-axis structure. However, since the steering force transmitting mechanism 1006 according to preferred embodiments of the present invention has the two-axis structure, the steering angle of the handle bar is large. When the steering angle of the handle bar is large, the turning performance of the vehicle is improved, but the influence of the inner-outer wheel difference of the first front wheel 1031 and the second front wheel 1032 becomes large, such that smooth steering of the first front wheel 1031 and the second front wheel 1032 might be interrupted. In this case, the riding comfort level of the vehicle 1001 might be lowered. Hence, in a preferred embodiment of the present invention, as one example of a preferable configuration, the steering force transmitting mechanism 1006 supports the first front wheel 1031 and the second front wheel 1032 so that the wheels have postures in which the Ackermann geometry is established easily during steering. Hence, even when large steering is performed, the turning radius of the first front wheel 1031 is close to that of the second front wheel 1032. For this reason, the first front wheel 1031 and the second front wheel 1032 are steered smoothly about the first axle 1314 and the second axle 1324. As a result, the riding comfort level of the vehicle 1001 is improved.

Furthermore, in the vehicle 1001 including the first front wheel 1031 and the second front wheel 1032 that are tilted by the tilting operation, the surfaces of the first front wheel 1031 and the second front wheel 1032 making contact with the ground are changed during the tilting operation. Because of the influence of this change, the inner-outer wheel difference is absorbed to some extent. Hence, in the vehicle 1001, with the above-described configuration, the riding comfort during the turning is improved, although it is not necessarily required to have a structure in which the Ackermann geometry is established completely.

In the above-described preferred embodiments, as a configuration that supports each front wheel, it is exemplified a shock absorber provided with two telescopic elements connected so as to be parallel or substantially parallel to the front-rear direction. However, the shock absorber is not limited to this example. For example, a shock absorber provided with a single telescopic element may be used, or the front wheel may be supported using a leading-link type bottom link suspension.

The vehicle according to a preferred embodiment of the present invention is a vehicle including a tiltable vehicle body frame and two front wheels. The number of rear wheels thereof is not limited to one but may be two. Furthermore, the vehicle may include a vehicle body cover that covers the vehicle body frame. The vehicle may not include a vehicle body cover that covers the vehicle body frame. The power source of the vehicle is not limited to an engine but may be an electric motor or other power source, for example.

In preferred embodiments of the present invention, the members that are turned together with the first support device in accordance with the turning of the steering member are included in the first support device. The members that are turned together with the second support device in accordance with the turning of the steering member are included in the second support device.

In preferred embodiments of the present invention, the term "parallel" includes not only a state in which no intersection occurs infinitely but also states in which an inclination occurs in the range of about ±30 degrees, for example, from the state in which no intersection occurs infinitely. The terms and expressions used herein are used for explanation but not for limited interpretation. No equivalents of features indicated and described herein are eliminated, and various modifications within the scope of the claims of the present invention must be recognized to be allowable.

The present invention is embodied in a variety of different forms. This disclosure should be regarded to provide preferred embodiments based on the principle of the present invention. Numerous illustrated preferred embodiments have been described herein under the understanding that the present invention is not intended to be limited to the preferable preferred embodiments described/or illustrated herein.

Some of illustrated preferred embodiments according to the present invention have been described herein. The present invention is not limited to the various preferred embodiments described herein. The present invention includes all the preferred embodiments including equivalent elements, modifications, deletions, combinations (for example, the combinations of features common to various preferred embodiments), improvements and/or changes that are recognized by those skilled in the art on the basis of this disclosure. The limitations in the claims should be construed widely on the basis of the terms used in the claims and should not be limited to the preferred embodiments described in the present specification or during the prosecution of the present application. Those preferred embodiments should be construed as non-exclusive. For example, in this disclosure, the terms "preferred" and "preferable" are not exclusive and the meanings of these terms are "preferred but not limited to this" and "preferable but not limited to this."

This application claims priority to Japanese Patent Application No. 2012-209873 filed on Sep. 24, 2012 and Japanese Patent Application No. 2013-138479 filed on Jul. 1, 2013, the contents of which are each hereby incorporated by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a vehicle body frame including a head pipe;
a steering member including a turning axis supported by the head pipe such that the steering member is turnable relative to the vehicle body frame;
a first front wheel disposed to the left of a center of the vehicle in a vehicle width direction;
a second front wheel disposed to the right of the center of the vehicle in the vehicle width direction;
a first supporting device disposed to the left of the center of the vehicle in the vehicle width direction, and supporting the first front wheel so as to be turnable in accordance with a turning motion of the steering member;
a second supporting device disposed to the right of the center of the vehicle in the vehicle width direction, and supporting the second front wheel so as to be turnable in accordance with turning motion of the steering member; and
a steering force transmitting mechanism including a tie rod extending in a left-right direction of the vehicle, and configured to transmit a steering force, which is input to the steering force transmitting mechanism, to the first front wheel and to the second front wheel;
wherein
the steering force transmitting mechanism includes:
a center transmission portion configured to not turn relative to the steering member;
a first turnable portion supported by the center transmission portion, and configured to turn relative to the center transmission portion about a first up-down turning axis extending in an up-down direction;
a first supporting portion connected to the first turnable portion, and supporting a center portion of the tie rod so as to be turnable relative to the first turnable portion about a first front-rear turning axis extending in a front-rear direction;
a second supporting portion supported by a left portion of the tie rod, and configured to turn relative to the left portion of the tie rod about a second front-rear turning axis extending in the front-rear direction;

a second turnable portion connected to the second supporting portion;

a left transmission portion configured to not turn relative to the first supporting device, being connected to the second turnable portion, and configured to turn relative to the second turnable portion about a second up-down turning axis extending in the up-down direction;

a third supporting portion supported by a right portion of the tie rod, and configured to turn relative to the right portion of the tie rod about a third front-rear turning axis extending in the front-rear direction;

a third turnable portion connected to the third supporting portion; and a right transmission portion configured to not turn relative to the second supporting device, being connected to the third turnable portion, and configured to turn relative to the third turnable portion about a third up-down turning axis extending in the up-down direction.

2. The vehicle as set forth in claim 1, wherein:
the first supporting portion is connected to a front portion of the first turnable portion;
the second supporting portion is connected to a front portion of the second turnable portion; and
the third supporting portion is connected to a front portion of the third turnable portion.

3. The vehicle as set forth in claim 1, wherein:
the tie rod is a plate-shaped member extending in the left-right direction; and
a length of the tie rod in the up-down direction is longer than a length of the tie rod in the front-rear direction.

4. The vehicle as set forth in claim 1, further comprising a link mechanism including a turnable member extending in the left-right direction, supported by the vehicle body frame, configured to turn relative to the vehicle body frame about a turning axis disposed above the first front wheel and the second front wheel, and configured to tilt each of the first front wheel and the second front wheel in accordance with a turning motion of the turnable member.

5. The vehicle as set forth in claim 1, wherein a distance in the left-right direction between the second up-down turning axis and the third up-down turning axis is longer than a distance in the left-right direction between a turning axis of the first supporting device extending in the up-down direction and a turning axis of the second supporting device extending in the up-down direction.

* * * * *